United States Patent [19]

Pierce et al.

[11] Patent Number: 5,722,311
[45] Date of Patent: Mar. 3, 1998

[54] FLUID-OPERATED BRAKE ACTUATOR WITH SPRING CHAMBER ISOLATION

[75] Inventors: William C. Pierce; William J. Hicks, both of Muskegon; Steven M. Stojic, Holland, all of Mich.

[73] Assignee: Nai Anchorlok, Inc., Muskegon, Mich.

[21] Appl. No.: 433,359
[22] PCT Filed: Jul. 25, 1994
[86] PCT No.: PCT/US94/08421
§ 371 Date: May 1, 1995
§ 102(e) Date: May 1, 1995
[87] PCT Pub. No.: WO95/25030
PCT Pub. Date: Sep. 21, 1995

Related U.S. Application Data

[63] Continuation-in-part of Ser. No. 54,757, Apr. 27, 1993, Pat. No. 5,372,059.

[51] Int. Cl.$^6$ ........................................ F01B 7/00
[52] U.S. Cl. ............................ 92/63; 92/130 A; 92/82
[58] Field of Search ........................ 92/63, 130 A, 92/82, 48; 91/399

[56] References Cited

U.S. PATENT DOCUMENTS

| | | |
|---|---|---|
| 2,931,616 | 4/1960 | White et al. . |
| 3,101,219 | 8/1963 | Herrera . |
| 3,155,012 | 11/1964 | Ayers, Jr. . |
| 3,659,501 | 5/1972 | Beard . |
| 3,696,711 | 10/1972 | Berg et al. . |
| 3,710,692 | 1/1973 | Valentine ........................... 92/63 |
| 3,712,178 | 1/1973 | Hensley . |
| 3,730,056 | 5/1973 | Swander, Jr. . |
| 3,736,842 | 6/1973 | Valentine ........................... 92/63 |
| 4,960,036 | 10/1990 | Gummer et al. . |
| 5,372,059 | 12/1994 | Pierce et al. ...................... 92/48 |
| 5,377,579 | 1/1995 | Pierce ............................... 92/63 |

FOREIGN PATENT DOCUMENTS

| | | |
|---|---|---|
| 531795 | 10/1956 | Canada . |
| 0025558 | 3/1981 | European Pat. Off. . |
| 0554050 | 8/1993 | European Pat. Off. ........ 92/130 A |
| 1906818 | 10/1969 | Germany . |
| 513774 | 2/1955 | Italy . |
| 0 007 809 | 1/1978 | Japan . |

*Primary Examiner*—Thomas E. Denion
*Attorney, Agent, or Firm*—Rader, Fishman, Grauer & McGarry

[57] ABSTRACT

A brake actuator (10) for a vehicle comprises a service brake housing (14), a tandem spring brake housing (16) and a diaphragm (52), dividing the interior thereof into a first spring chamber (62) and a second spring chamber (63). In one embodiment, the first spring chamber (62) is completely sealed from the environment, being open only through a hollow actuator rod (56) connected to the diaphragm (52) and extending from the first spring brake chamber (62) into the service brake housing (14). A control valve (300) in the actuator rod (56) controls flow through the actuator rod (56) and is closed when the actuator rod (56) is retracted and also when the actuator rod (56) is extended to apply the brakes. The control valve (300) is open only as the diaphragm (52) and actuator rod (56) are moving. In an alternative embodiment, the spring chamber (63) has one-way vents (100) for releasing pressure therefrom and a control valve (120) in the actuator rod (56) for blocking flow therethrough when the actuator rod (56) is in a retracted position.

15 Claims, 16 Drawing Sheets

FLUID-OPERATED BRAKE ACTUATOR WITH SPRING CHAMBER ISOLATION

CROSS-REFERENCE TO RELATED APPLICATIONS

This application is a continuation-in-part of U.S. application Ser. No. 08/054,757, filed Apr. 27, 1993 now issued as U.S. Pat. No. 5,372,059 on Dec. 13, 1994.

BACKGROUND OF THE INVENTION

1. Field of the Invention

The invention relates to fluid-operated brake actuators for vehicles and more particularly to service and spring brake actuators combined in tandem and having a hollow spring brake actuator rod.

2. State of the Prior Art

An air brake system for a vehicle such as a bus, truck or the like typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. Typically, the spring brake actuator is disposed in tandem with the service brake actuator.

The spring brake actuator is typically divided into two chambers separated by a rubber diaphragm and pressure plate, with the spring in one of the chambers acting between an end wall of the spring brake housing and the pressure plate. When full pressure is applied to the opposite chamber, air pressure acting against the diaphragm and pressure plate compresses the spring. In many applications, a spring brake actuator rod is held in a retracted position by a relatively small return spring. In newer applications, the spring brake actuator rod is integral with the pressure plate and held in a retracted position by the air pressure.

In both designs, the spring brake actuator rod thus does not affect the normal operation of the brake. The service chamber is typically divided into two chambers by a diaphragm. Depressing the brake pedal during normal driving operation introduces compressed air into one of the chambers of the service brake actuator which, acting against the diaphragm, causes a service brake push rod in the opposite chamber to be extended and the brakes to be applied with an application force proportional to the air pressure in the service brake actuator.

In the event of a loss of air pressure or an intentional exhaustion of air from the spring brake actuator, the brake will be mechanically activated by the force of the strong compression spring acting on the spring brake actuator rod which, in turn, acts upon the service brake push rod to apply the brakes. Thus, the spring brake portion serves both as a parking brake and an emergency brake.

In tandem actuator assemblies, the spring brake push rod typically extends from a chamber in the spring brake portion, through an aperture in a wall separating the spring brake actuator from the service brake actuator, and into a chamber in the service brake portion. Because at least one of the adjoining chambers is usually pressurized, a seal is provided at the aperture around the push rod comprising one or more O-rings positioned in annular channels in the wall around the aperture.

When pressure is released from the spring brake actuator, the spring and diaphragm extend significantly, expanding the volume of the spring brake actuator chamber containing the spring. A port must be provided for air to enter the expanded volume of the chamber. Conversely, when the spring is retracted, and the volume of the chamber contracts, a port must be provided for evacuating air from the chamber. In many prior brake actuators, the chamber containing the spring is simply open to atmosphere through ports in the chamber housing. However, dirt, salt, moisture and other unwanted material enter that chamber through the ports. With the advent of hollow actuator rods containing caging tools, the presence of foreign material within the actuator rod has become an increasing concern of brake designers.

Some prior designs have attempted to address this problem by providing a breather tube between the push rod chamber of the service brake actuator and the spring chamber of the spring brake actuator, as in the U.S. Pat. No. 4,960,036 to Gummer et al. In this design, the push rod chamber of the service brake actuator must be vented to atmosphere for normal application of the brakes. Venting of the push rod chamber occurs either through a separate vent, or through the external opening carrying the push rod. Thus, the spring chamber of the spring brake actuator remains open to atmosphere, and is still exposed to moisture, dirt and grime, albeit through a longer passage than a fully vented spring chamber. This longer passage may also prevent the spring chamber from drying as effectively as a sealed or more fully vented spring chamber.

Hensley U.S. Pat. No. 3,712,178 discloses an air-operated spring brake actuator in which a hollow actuator rod is positioned between a spring chamber and a service chamber. The end of the actuator rod within the service brake chamber has ports which open into the service brake chamber when the actuator rod moves from a retracted position to an extended position so that air moves from the service chamber to the spring chamber as the brake is applied by the spring. The spring chamber is otherwise closed to the atmosphere. Air also passes through the hollow actuator rod from the spring chamber to the service chamber as the actuator rod is retracted. A boss on the service chamber side of the partition between the service chamber and the spring chamber sealingly receives the end of the actuator rod when the actuator rod is retracted to close off the actuator ports.

SUMMARY OF THE INVENTION

According to the invention, a control valve is mounted in the distal end of a hollow actuator rod to control the flow of fluid pressure through the actuator rod between a service brake chamber and a spring brake chamber. The brake actuator is of the type comprising a service brake housing, an adapter housing, a first movable member disposed within the service brake housing, dividing the interior thereof into a first service brake chamber and a second service brake chamber, and reciprocally movable therein in response to delivery and exhaust of pressurized fluid to the first service brake chamber. A second movable member is disposed within the adapter housing, dividing the interior thereof into a first spring brake chamber and a second spring brake chamber, and is reciprocally movable therein in response to the delivery and exhaust of pressurized fluid to the second spring brake chamber. A power spring is disposed in the first spring brake chamber in a position to move the second movable member upon exhaust of fluid from the second spring brake chamber. A hollow actuating rod has an open proximal end extending through the second movable member for reciprocal movement therewith between an extended position and a retracted position and has an open distal end disposed within the first service brake chamber in a position to move the first movable member when the second movable member moves. The control valve according to the invention has a valve element movable between an open position to open the control valve and a closed position to close the control valve and further has a biasing element to bias the valve element to the open position. A valve actuator is positioned in the actuator rod to contact the valve element when the actuator rod is in the retracted position and move the valve element to the closed position to close the control valve. In this manner, pressurized fluid is delivered to the first spring brake chamber from the first service brake chamber through the hollow actuator rod as the actuator rod moves from the retracted position to the extended position and pressurized fluid is delivered from the first spring brake chamber to the first service brake chamber through the hollow actuator rod as the actuator rod moves from the extended position to the retracted position. Further, pressurized fluid is prevented from moving from the first service brake chamber to the first spring brake chamber through the actuator rod when the actuator rod is in the retracted position.

In one embodiment, the first spring chamber is open only through the control valve. In another aspect of the invention, the spring chamber has a check valve to exhaust pressurized fluid from the first spring brake chamber. Preferably, the brake actuator has a caging bolt extending into the interior of the hollow actuator and an end of the caging bolt forms the valve actuator.

In accordance with one embodiment of the invention, the control valve has a second valve element movable between an open position to open the control valve and a closed position to close the control valve and further has a second biasing element to bias the second valve element to the open position. The second valve element is movable to the closed position when an axial force is applied to the distal end opposed to the movement of the actuator rod to the extended position to overcome the force of the second biasing element to bias the second element to the open position. In this manner, the control valve is closed when the actuator rod is in the extended position and when a brake is applied by the power spring.

Also according to the invention, a brake actuator for a vehicle of the type described above has a control valve at an actuator rod distal end to control the flow of fluid through the actuator rod. According to the invention, the control valve has a valve element movable between an open position to open the control valve and a closed position to close the control valve and further has a biasing element to bias the valve element to the open position. The valve element is movable to the closed position when an axial force is applied by the first movable member to the distal end of the actuator rod to overcome the force of the biasing element. In this manner, the control valve is closed when the actuator rod is in the extended position and when a brake is applied by the power spring.

The invention provides a way to seal the spring brake chamber from the environment except for the passage of fluid from the first service chamber through the hollow actuator rod. In one embodiment, the control valve is closed when the hollow actuator rod is in the retracted and the extended positions and is otherwise open when the hollow rod is moving between the two positions. In another embodiment, the control valve is opened when the hollow actuator rod is moving to and from the extended position and further when the hollow rod is in the extended position. In this embodiment, a check valve is provided in the spring chamber to exhaust pressurized fluid from the spring chamber. Thus, the spring chamber in both instances is protected from contamination from the environment.

DETAILED DESCRIPTION OF THE DRAWINGS

Figure 1:
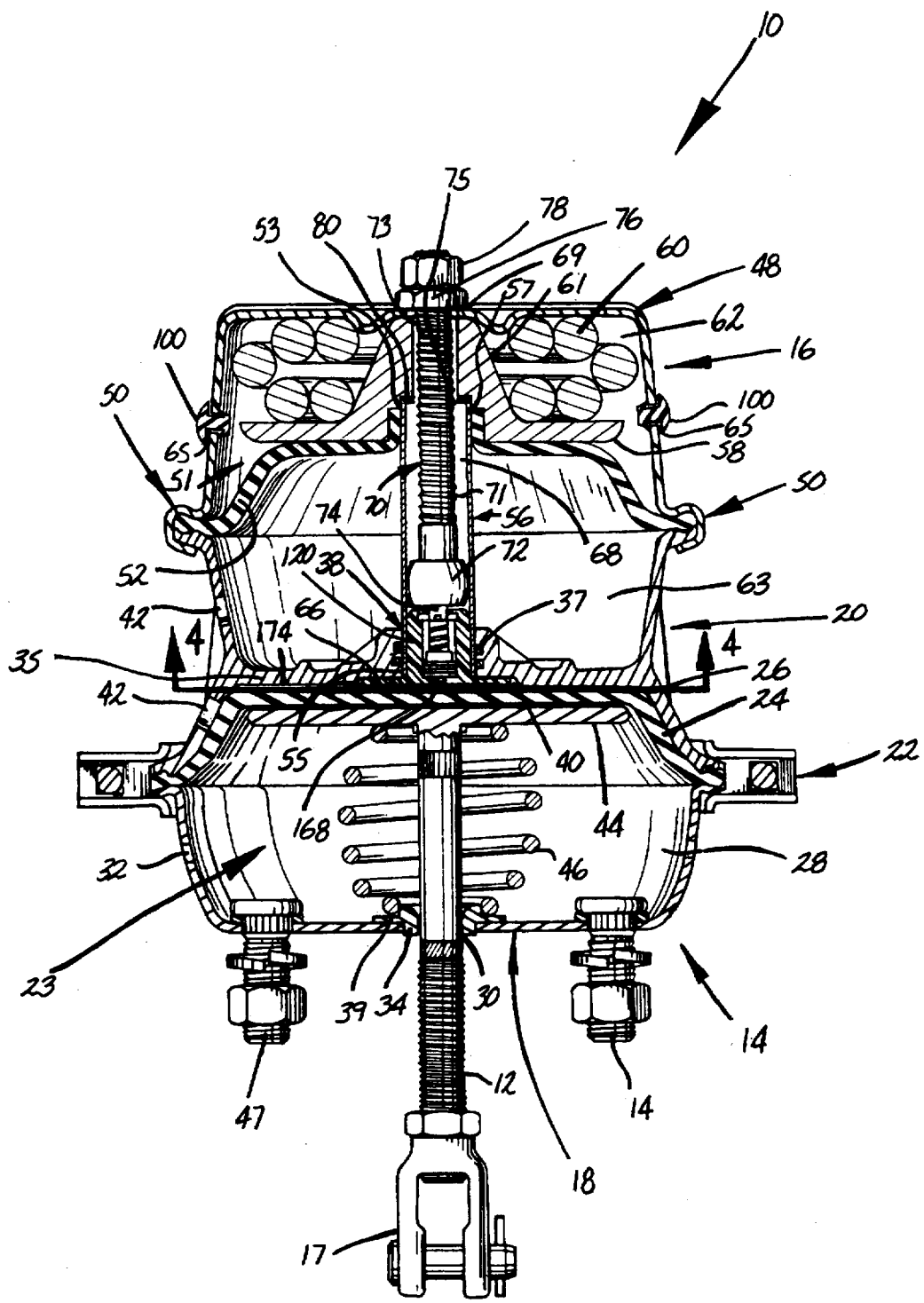
FIG. 1 is a cross-sectional view of an air-operated brake actuator with vents and control valve of an isolation system according to the invention.

FIG. 1 illustrates a fluid-operated brake actuator 10 having a general configuration well known in the art. The fluid-operated brake actuator 10 comprises a service brake actuator 14 mounted in tandem to a spring chamber or emergency brake actuator 16. A service brake push rod 12 extends from the service brake actuator 14 for reciprocating movement between a retracted position and an extended actuating position relative to the service brake actuator 14, and is provided with a clevis 17 which is adapted to connect to a conventional brake shoe and drum (not shown) in a standard fashion. Reciprocating motion of the service brake push rod 12 will cause the brake to be alternately applied and released.

The service brake actuator 14 comprises a cup-shaped service housing section 18 and a double cup-shaped adapter housing 20 joined together by a clamp 22 to form a service brake chamber 23. The adapter housing 20 is also sometimes known as a flange case.

A first elastomeric diaphragm 24 (also known as the service brake diaphragm) is suspended within the service brake chamber 23, the peripheral edge thereof secured in fluid tight enclosure between the cup-shaped service housing section 18 and the service side of the adapter housing 20 by the clamp 22. The first elastomeric diaphragm 24 thus separates the service brake chamber 23 into two portions: a first service chamber portion 26 and a second service chamber portion 28. The first service chamber portion 26 communicates with a source of pressurized air (not shown) through an air service port 42 in the adapter housing 20. The second service chamber portion 28 is vented to the atmosphere through at least one opening 32 in the cup-shaped service housing section 18. In FIG. 1, the first service chamber portion 26 is shown evacuated so that the first elastomeric diaphragm 24 is forced against the adapter housing 20 because of the force from spring 46 in the second service chamber portion 28.

The service brake push rod 12 extends through a central opening 30 in the cup-shaped service housing section 18 and has a pressure plate 44 at the end thereof within the second service chamber portion 28. The pressure plate 44 bears against the first elastomeric diaphragm 24. A compression spring 46 extends between the pressure plate 44 and the interior surface of the cup-shaped service housing section 18. A push rod guide 34 having an annular seat 39 is disposed within the central opening 30 to guide reciprocal movement of the service brake push rod 12 within the central opening 30 and also to receive the end of the compression spring 46 and retain it in position around the central opening 30. The compression spring 46 thus urges the pressure plate 44 and the service brake push rod 12 to a fully retracted position as depicted in FIG. 1.

To operate the service brake, compressed air is introduced through the air service port 42 into the first service chamber portion 26 to create a force against the first elastomeric diaphragm 24 and pressure plate 44 sufficient to overcome the force of the compression spring 46, thereby extending the service brake push rod 12 toward the actuating position. The openings 32 permit rapid evacuation of air from the lower service chamber section 23 as the service brake is actuated. Mounting studs 47 are provided to mount the fluid-operated brake actuator 10 onto a vehicle (not shown).

The spring chamber or emergency brake actuator 16 is defined by the spring side of the adapter housing 20 and a generally cylindrical head 48 or spring chamber, which is clamped to the spring side of the adapter housing 20 by a clamp 50 to form the spring brake chamber 51. A second elastomeric diaphragm 52, known as the spring diaphragm, is suspended within the spring brake chamber 51, the peripheral edge thereof secured in fluid tight enclosure between the cylindrical head 48 and the spring side of the adapter housing 20 by the clamp 50. The second elastomeric diaphragm 52 thus separates the spring brake chamber 51 into two portions: a first spring chamber portion 62 and a second spring chamber portion 63. The second spring chamber portion 63 is filled with pressurized air supplied through an air service port 54 in the adapter housing 20 when the emergency brake is in its normal released position as depicted in FIG. 1.

The adapter housing 20 includes a divider wall 35 which separates the adjoining service brake chamber 23 and spring brake chamber 51. A spring brake actuator rod 56, aligned with the service brake push rod 12, has one end extending from the spring brake chamber 51 through a central opening 38 in divider wall 35 for reciprocating motion through the central opening 38 between a retracted position and an actuating position. One or more O-ring seals 37 are provided in the central opening 38 through which the spring brake actuator rod 56 reciprocates.

A distal end 55 of the spring brake actuator rod 56 terminates in a reaction plate 66 in the first service chamber portion 26, and which is received in an annular seat 40 when the spring brake actuator rod 56 is in the retracted position as depicted in FIG. 1. An opposite, proximal end 57 of the actuator rod 56 extends through an opening 53 in the second elastomeric diaphragm 52 and terminates in a pressure plate 58 which abuts an end of a large force compression spring 60. The pressure plate 58 abuts one end of the compression spring 60. A tubular portion 61 of the pressure plate 58 extends generally axially along the axis of the compression spring 60. The tubular portion 61 of pressure plate 58 is press-fit into the proximal end 57 of the spring brake actuator rod 56 such that the pressure plate 58 and the spring brake actuator rod 56 form an integral unit with the second elastomeric diaphragm 52 secured therebetween.

During normal operation of the fluid-operated brake actuator 10, the spring brake actuator rod 56 will be in the fully retracted position, as depicted in FIG. 1, by means of compressed air which is maintained in the second spring chamber portion 63. When the compressed air is exhausted from the second spring chamber portion 63, the compression spring 60, one end of which abuts the outer end wall of the cylindrical head 48, forces the integral pressure plate 58 and spring brake actuator rod 56 in the direction of the service brake push rod 12. The force of the compression spring 60 causes the spring brake actuator rod 56 to be extended through the central opening 38, thereby causing the reaction plate 66 to apply a force to the first elastomeric diaphragm 24 and pressure plate 44 of the brake actuator 14. This action causes the service brake push rod 12 to be extended toward the actuating position, thereby applying the brake (not shown). When the spring brake actuator 16 is to be released, compressed air is once again introduced into the second spring chamber portion 63 to a pressure sufficient to overcome the force of the compression spring 60. The force of the compressed air against the second elastomeric diaphragm 52 causes the pressure plate 58, the spring brake actuator rod 56 and the compression spring 60 to be returned to the position depicted in FIG. 1.

In the embodiment shown, the spring brake actuator rod 56 is a hollow tube or rod provided with a central bore 68 to accommodate a brake release rod or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The caging tool 70 comprises a threaded elongated shaft 71, with one end having an enlarged head portion 72, which terminates in a valve pin 74. The opposite end of the caging tool 70 is threaded through a head nut 76 fixedly mounted to the cylindrical head 48, and has a hex head nut 78 fixedly secured thereto.

The caging tool 70 primarily functions as a manual retraction tool for the powerful compression spring 60. Rotation of the hex head nut 78, threads the shaft 71 through the head nut 76, to axially move the caging tool 70 with respect to the cylindrical head 48. The head portion 72 slides freely within the bore 68 of the actuator rod 56, yet is restrained by an inwardly directed annular flange 80 at the actuator rod proximal end 57. Thus, withdrawal of the caging tool 70 by rotation of the hex head nut 78, causes the head portion 72 to abut the flange 80, and retract the pressure plate 58 and spring 60. For safety, the spring 60 is typically retracted during repairs to the brake actuator 10 and during shipping.

The cylindrical head 48 includes one or more ports 65 therein which establish communication between the first spring chamber portion 62 and the atmosphere. A one-way vent 100, installed in each port 65, controls the flow of air through the port.

Figure 2:
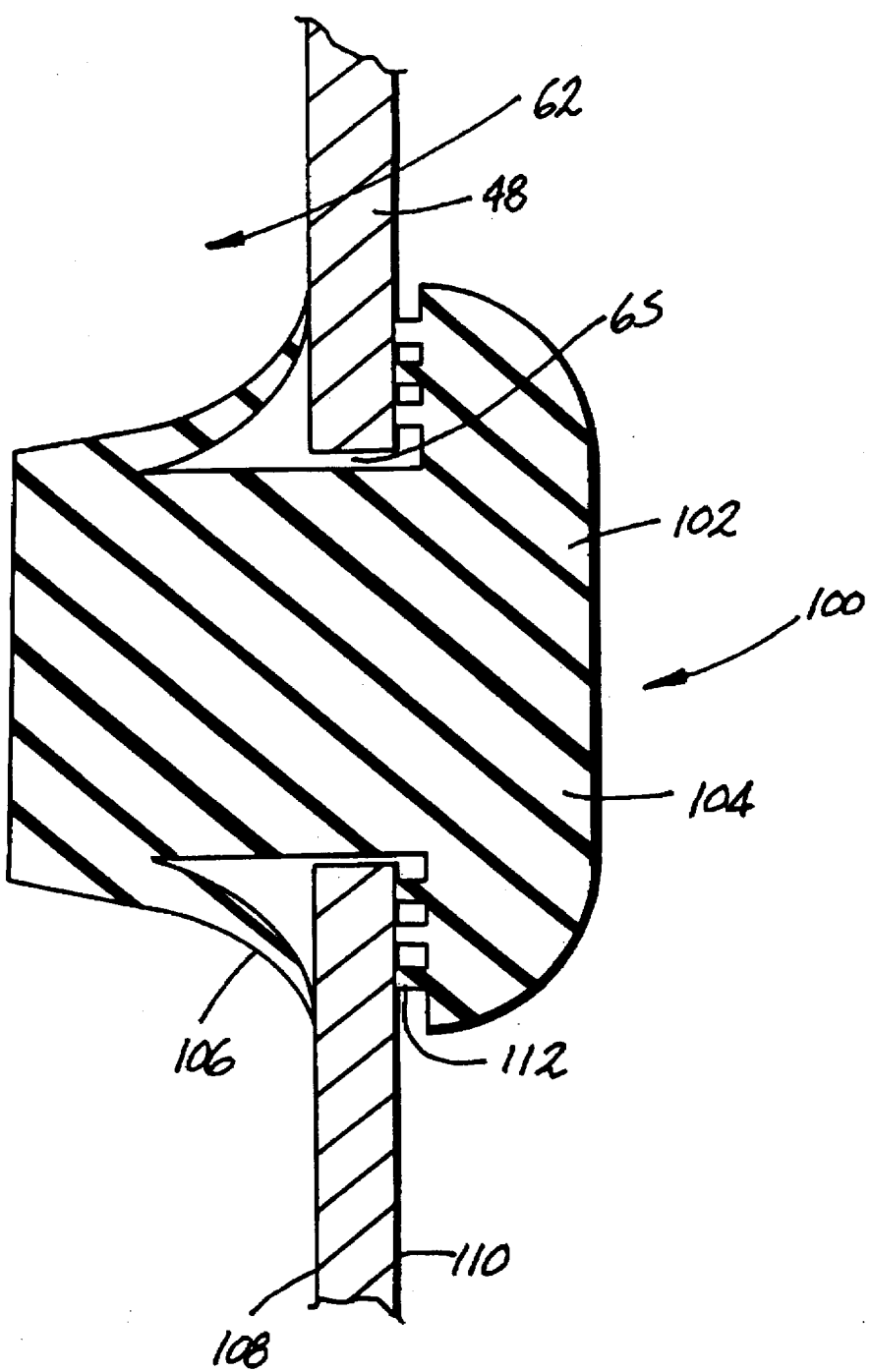
FIG. 2 is an enlarged fragmentary cross sectional view of the vents of FIG. 1.

Turning now to FIG. 2, it can be seen that the vent 100 comprises a mushroom shaped cap 102 external to the first spring chamber portion 62, a shaft 104 received within the port 65, and a plurality of flexible tabs 106 sloping outwardly from the shaft 104, from a point interior of the first spring chamber 62, toward the cap 102. The tabs 106 abut an interior surface 108 of the cylindrical head 48 and bias the vent cap 102 against an exterior surface 110 of the cylindrical head 48.

The vent 100 thus prevents air and contaminants in the atmosphere from entering the first spring chamber portion 62 through the port 65. One or more concentric rings 112 on the cap 102 contact the exterior surface 110 of the cylindrical head 48 to enhance the seal formed between the cap 102 and the cylindrical head 48. Elevated pressure within the first spring chamber portion 62 will overcome the biasing force of the tabs 106 and vent cap 102 and allow air within the first spring chamber portion 62 to exhaust through the port 65. Preferably, the biasing force of the tabs 106 will prevent the vent 100 from opening until the pressure within the first spring chamber portion exceeds one to two psig, thereby maintaining a slight positive pressure within the first spring chamber portion 62. It will be apparent that when the volume within the first spring chamber portion 62 expands upon release of the spring 60, air flow into the chamber from atmosphere through the ports 65 will be blocked by the vents 100.

Returning to FIG. 1, air flow to the first spring chamber portion 62, in response to the extension of the spring 60, and diaphragm 52, comes through the actuator rod 56 and is controlled by a control valve 120 in the distal end 55 of the actuator rod 56. The control valve 120 controls the flow of air from the first service chamber portion 26 into the first spring chamber portion 62 in a manner to be more fully explained hereinafter.

Figure 3:
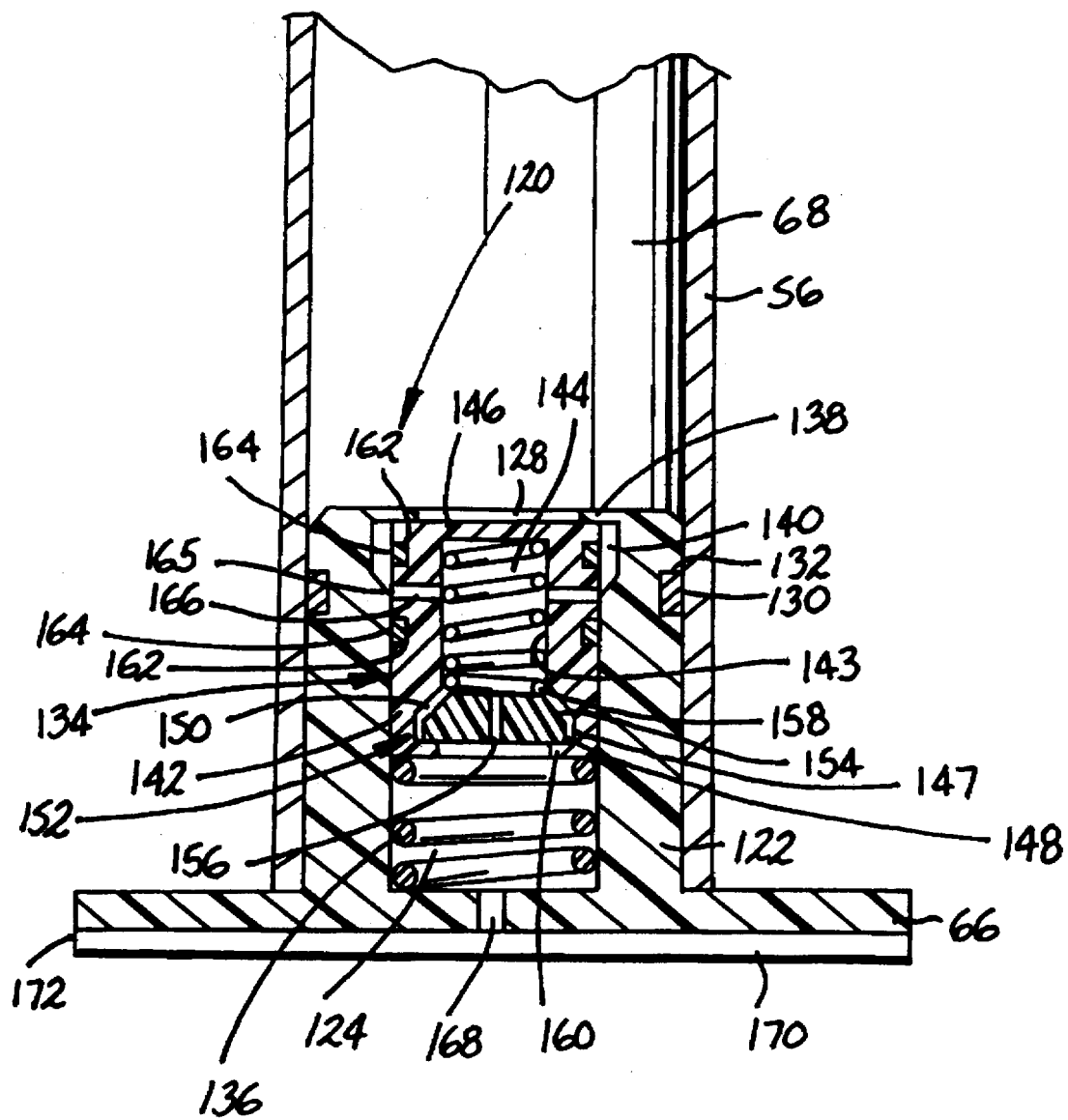
FIG. 3 is an enlarged fragmentary cross sectional view of the control valve of FIG. 1.

Turning to FIG. 3, the control valve 120 comprises a cylindrical body 122 integrally formed with the reaction plate 66, and having a cylindrical valve chamber 124 therein. The reaction plate 66 forms a closed end 126 of the valve chamber; an opposite end 128 is open. The control valve body 122 is press fit into the distal end 55 of the actuator rod 56, and is sealed thereto by an o-ring seal 130 in a circumferential groove 132 about the valve body 122.

A main piston 134 is mounted within the valve chamber 124 for axial reciprocal movement therein. A spring 136, positioned between the reaction plate 66 and the main piston 134, biases the main piston 134 away from the reaction plate 66. Outward movement of the main piston 134 is restrained by a plurality of radially inwardly directed projections 138 at the valve chamber's open end 128. An annular groove 140 is provided in the wall of the valve chamber 124 immediately adjacent the projections 138. Openings (not shown) between the projections 138 provide an open air passage between the annular groove 140 and the central bore 68 of the actuator rod 56.

The main piston 134 comprises a cylindrical body 142, having a first cylindrical interior wall 143 and an end wall 146, forming a cylindrical interior chamber 144; and a second cylindrical interior wall 147 forming a larger diameter cylindrical outer chamber 148. Outer chamber 148 opens at one end to the valve chamber 124, and at an opposite end to the interior chamber 144. A conical transition wall 150 separates the first interior wall 143 and the second interior wall 147.

A discoid shaped float piston 152 is disposed within the outer chamber 148 for reciprocal movement and comprises a chamfered annular edge 154 adapted to mate with the conical transition wall 150, and a small, axially extending, central aperture 156. A spring 158, positioned between the interior chamber end wall 146 and the float piston 152 biases the float piston 152 away from the end wall 146. A plurality of axially inwardly directed projections 160 or a snap ring, or a washer restrain the outward movement of the float piston 152.

A pair of annular grooves 162 in the outer surface of the main piston body 142 retain a pair of O-ring seals 164. A plurality of passageways 166 extend radially outwardly from the interior chamber 144, through the first cylindrical wall 143, and exit the main piston body 142 at points 165 between the annular seals 164. When the main piston 134 abuts the projections 138 as shown in FIG. 3, the radial passageways 166 align with the annular groove 140, putting the central bore 68 of the actuator rod 56 into fluid communication with the interior chamber 144 of the main piston 134.

Figure 6:
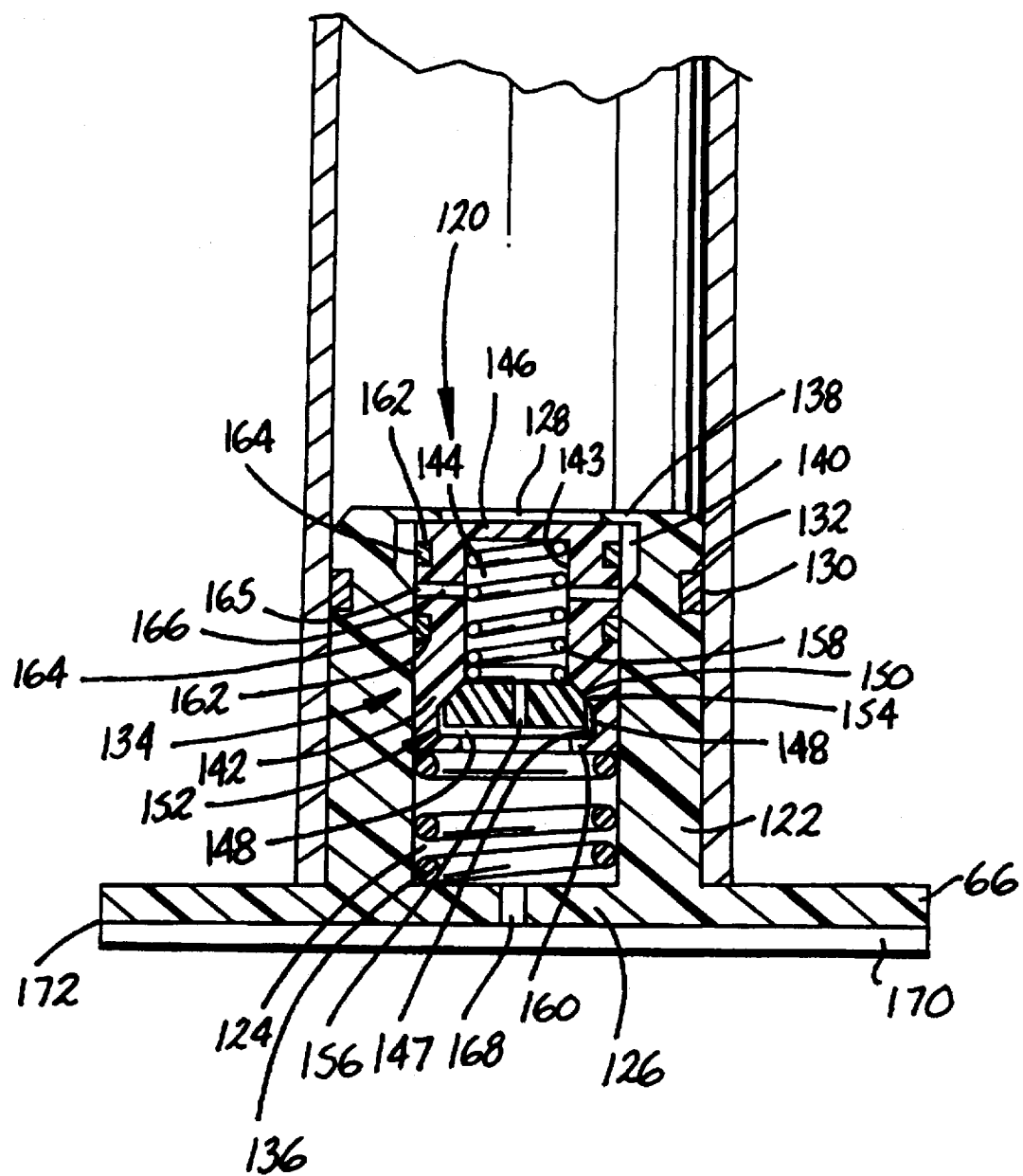
FIG. 6 is an enlarged fragmentary cross sectional view similar to FIG. 3, showing an additional operating condition of the control valve of FIG. 3.

Regardless of the position of the float piston 152 within the outer chamber 148, the interior chamber 144 communicates fluidly with the valve chamber 124, and ultimately with the first service chamber portion 26 (not shown in FIG. 3) through a central aperture 168 in the portion of the reaction plate 66 forming the valve chamber closed end 126. When the chamfered edge 154 of the float piston 152 abuts and seals against the conical transition wall 150 (see FIG. 6), fluid flow into the interior chamber 144 through the outer chamber 148 is possible only through the small aperture 156. However, when the float piston 152 abuts the inward radial projections 160 as shown in FIG. 3, flow may also pass around the float piston 152. Operation of the control valve 120, valve piston 134 and float piston 152 will be more fully described hereinafter.

Figure 4:
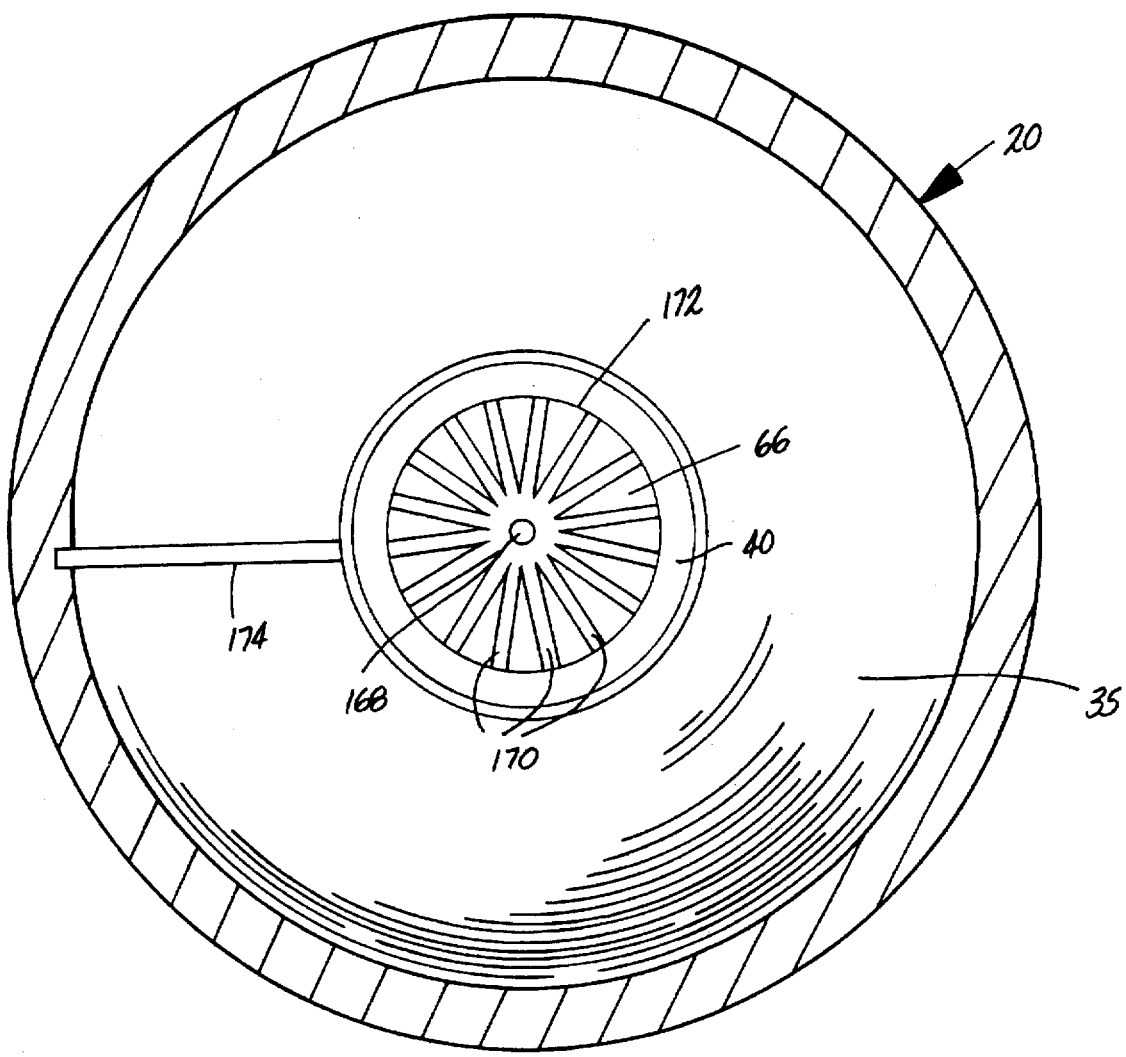
FIG. 4 is a sectional view taken along line 4—4 of FIG. 1.

Turning now to FIG. 4, a plurality of radial grooves 170 in the face of the reaction plate 66 lead from the central aperture 168 to a peripheral edge 172 thereof. A further groove 174 in the face of the wall 35, leads from the annular seat 40 in the adapter housing 20 to the air service port 42 (FIG. 1). Thus, even when the first service chamber portion is evacuated and the first elastomeric diaphragm 24 is forced against the adapter housing 20, as shown in FIG. 1, the valve chamber 124 remains in fluid communication with the air service port 42 through the grooves 170, 174.

Returning to FIG. 1, the control valve 120 controls the flow of air into the first spring chamber 62 from the air service port 42, through the central bore 68 of the actuator rod 56, and apertures 75 and 73 in the proximal end 57 of the actuator rod 56 and pressure plate 58. The control valve 120 restricts or blocks flow under some operating conditions and permits flow under other conditions.

Figure 5:
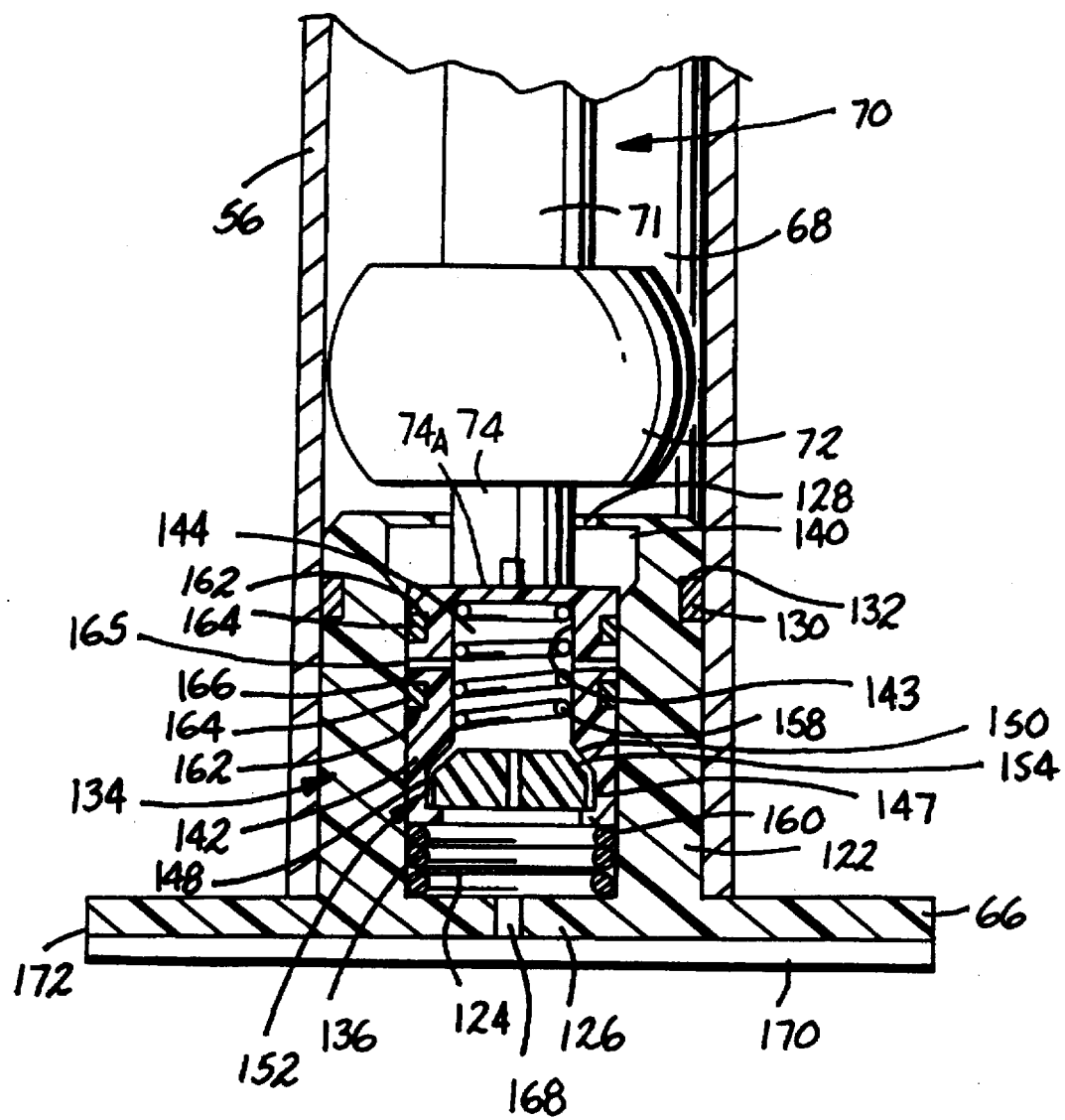
FIG. 5 is an enlarged fragmentary cross sectional view of the control valve of FIG. 3, shown in the normal operating condition.

A normal operating condition where the spring brake is not actuated is illustrated in FIG. 1 with the detail of the control valve 120 in this condition shown in FIG. 5. In this condition, the caging tool 70 is fully extended into the spring chamber 51. However, the second spring chamber portion 63 is pressurized so that the diaphragm 52 and pressure plate 58 keep the spring 60 and actuator rod 56 retracted. Selective application of pressurized air to the first service chamber 26 extends the push rod 12 to apply the brakes (not shown) in the normal manner.

Because the spring 60 and diaphragm 52 remain retracted, the first spring chamber portion 62 is static and does not require an inflow of air through the control valve 120. Hence, the control valve 120 is in the closed position as shown in FIG. 5. If the control valve 120 were open, the control valve 20 would exhaust air through the aperture 168, the control valve 120, the central bore 68 of the actuator rod 56, into the first spring chamber portion 62 and out to atmosphere through the vents 100 when pressurized air was introduced to the first service chamber portion 26.

The valve pin 74 on the caging tool 70 extends into the valve chamber open end 128, pushing the valve piston 134 toward the reaction plate 66, so that the radial passageways 166 are no longer aligned with the valve chamber annular groove 140. The radial passageways 166 abut the wall of the valve chamber 124, and the seals 164 prevent air from escaping from the piston interior chamber 144 into the upper portion of the valve chamber 124. The control valve 120 is thus closed and prevents air flow therethrough.

A second condition, when the spring brake is being applied, occurs when neither the second spring chamber portion 63, nor first service chamber portion 26 are pressurized. When pressure is lost in the second spring chamber portion 63, either due to a system failure or manual release, the spring 60 and the actuator rod 56 extend, thus moving the control valve 120 in the end of the actuator rod 56 away from the valve pin 74. This condition is illustrated in FIG. 3. Upon separation of the valve pin 74 from the end wall 146 of the control valve 120, the spring 136 pushes the valve piston 134 into abutment with the radial inward projections 138, putting the radial passageways 166 into alignment with the annular groove 140. The open control valve 120 allows air to flow from the air service port 42, through the control valve 120, through the hollow actuator rod 56 and into the expanding volume of the first spring chamber 62. The spring 158 keeps the float piston 152 in abutment with the inward projections 160, allowing air to freely flow past the float piston 152.

A third condition occurs when the service brake has been applied before activating or releasing the spring brake. In the third condition (detail illustrated in FIG. 6), pressure is lower in the first spring chamber portion 62 than the first service chamber 26 (as when the driver sets the parking brake by depressurizing the second spring chamber 63 while applying the service brake so that the first service chamber portion 26 is pressurized). The resulting pressure differential across the float piston 152 forces the chamfered edge 154 of the float piston 152 into sealing abutment with the conical transition wall 150, preventing flow around the float piston 152.

Any flow passing through the control valve 120 must pass through the small central aperture 156 in the float piston 152. The aperture 156 allows some flow to fill the expanding volume of the first spring chamber portion 62 as when the spring brake is being applied, for example, but restricts excess flow which would otherwise exhaust to atmosphere through the vents 100. Of course, when the service brake is released, thereby removing pressure from the first service chamber portion 26, and relieving the pressure differential across the float piston 152, the float piston 152 reverts to the position shown in FIG. 3.

As previously described with reference to FIG. 2, when the diaphragm 52 and spring 60 are retracted, reducing the volume of the first spring chamber portion 62, the vents 100 exhaust the excess air therein to atmosphere. The one to two psig positive pressure within the first spring chamber portion 62 inhibits introduction of foreign matter from the brake actuator's service environment into the first spring chamber portion 62 through the ports 65.

Figure 7:
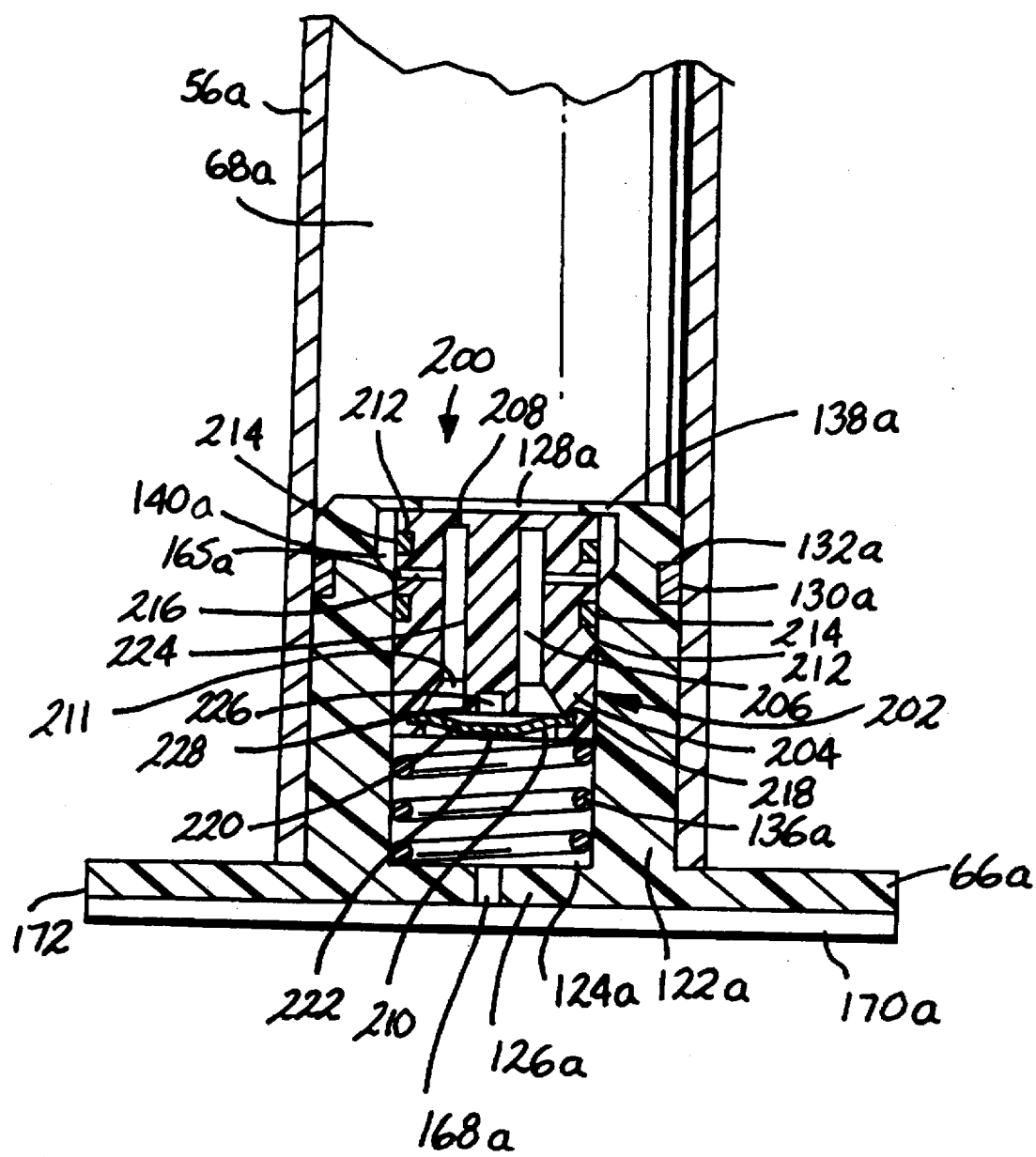
FIG. 7 is an enlarged fragmentary cross sectional view of a second embodiment of a control valve according to the invention.
Figure 8:
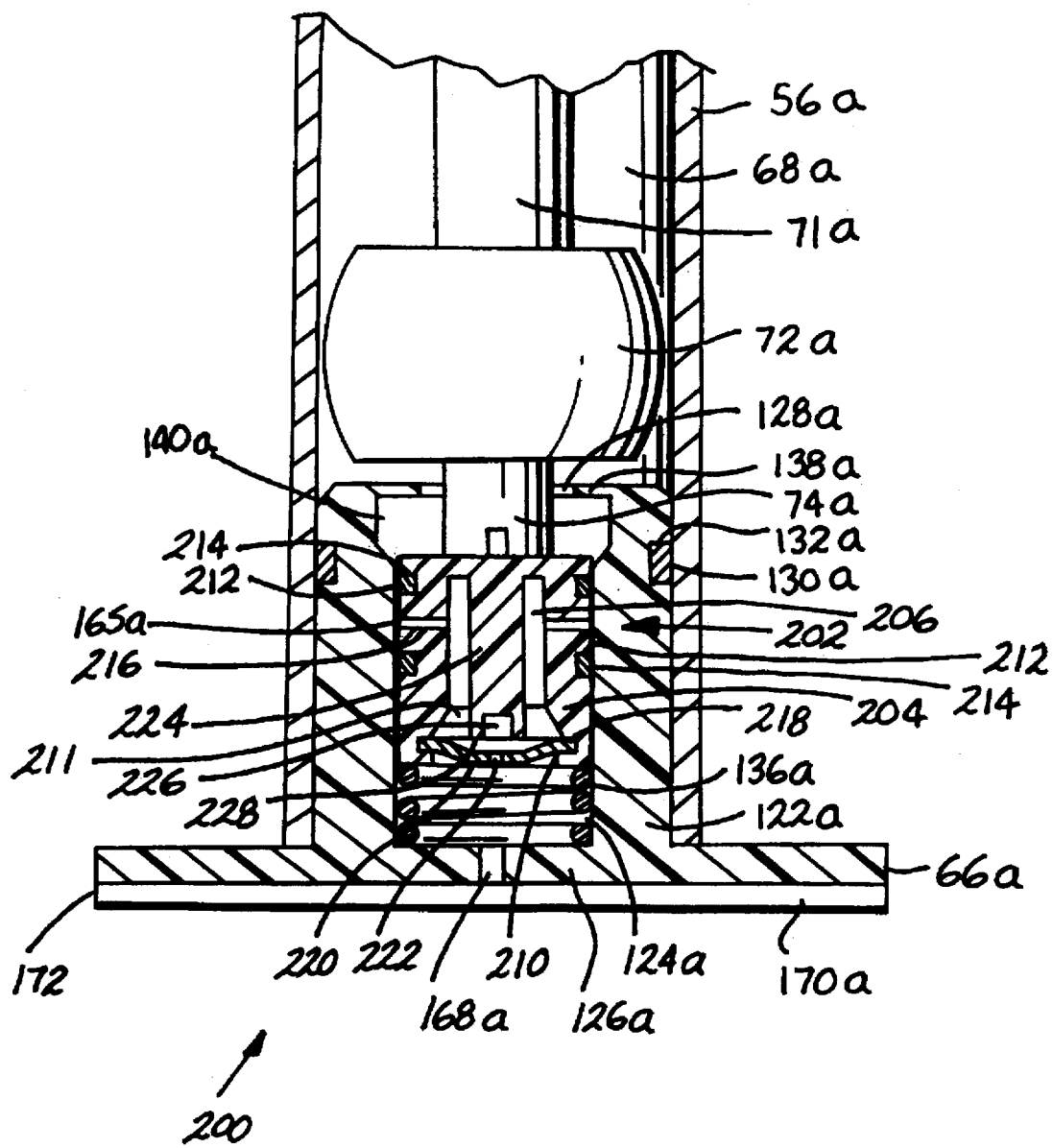
FIG. 8 is an enlarged fragmentary cross sectional view of the control valve of FIG. 7 shown in the normal operating condition.
Figure 9:
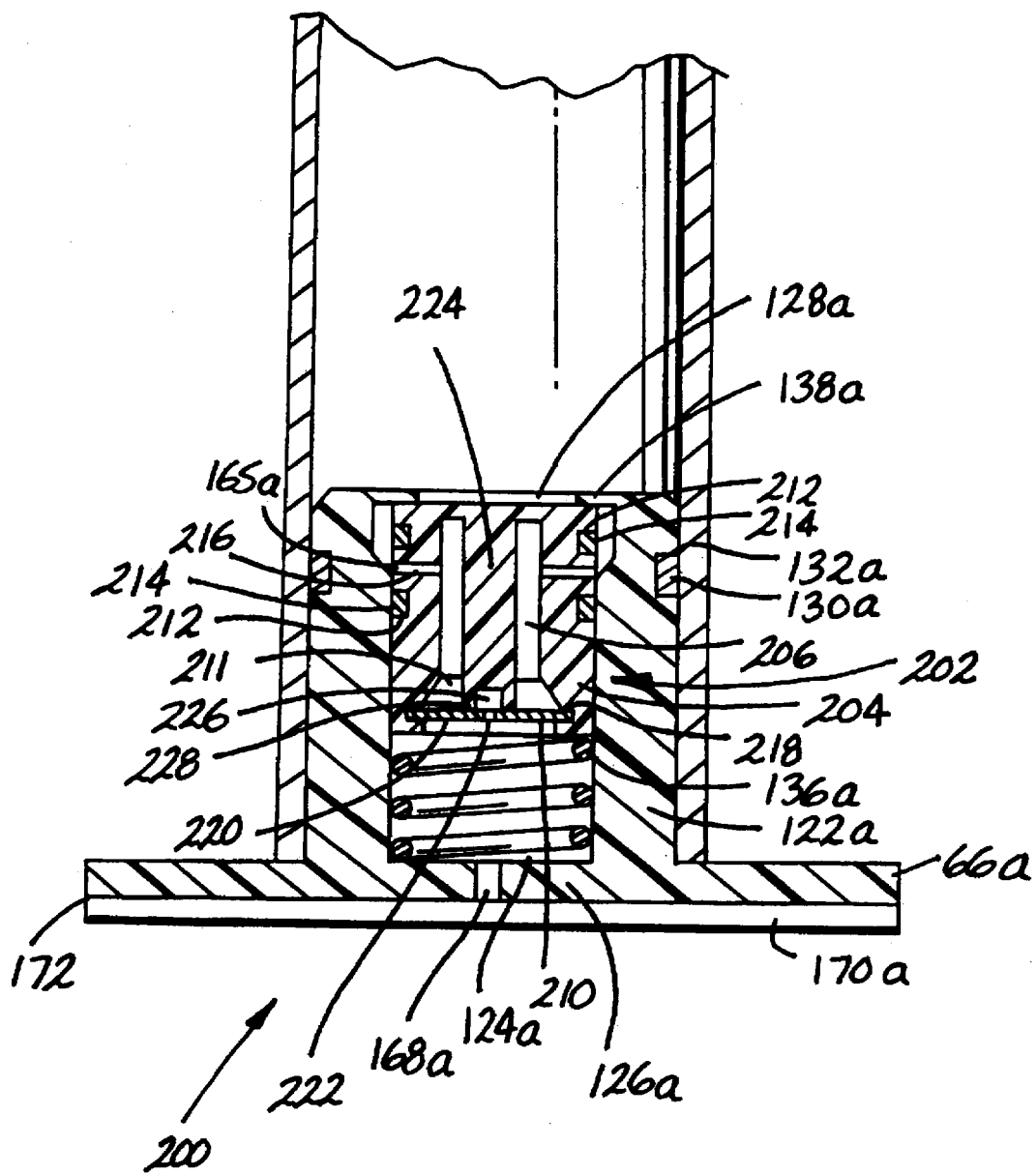
FIG. 9 is an enlarged fragmentary cross sectional view similar to FIG. 3 showing an additional operating condition of the control valve of FIG. 7.

A second embodiment of a control valve 200, according to the invention, is illustrated in FIGS. 7 to 9 where like parts are numbered with like numerals. Referring first to FIG. 7, the control valve 200 employs a valve body 122a substantially similar to the valve body 122 previously described with reference to the first embodiment control valve 120. A piston 202, received within the valve body 122a for reciprocal movement, comprises a cylindrical body 204, having a cylindrical interior chamber 206 with an end wall 208 and an open end 210, which opens into the valve chamber 124a. A short conical portion 211 of the interior chamber 206 expands outwardly toward the open end 210. A plurality of radial passageways 216 extend outwardly radially from the interior chamber 206 to exit the piston body 204 at points in alignment with the annular groove 140a when the piston 200 abuts the inward radial projections 138a. A pair of annular grooves 212 about the exterior of the piston on either side of the radial passageways 216 contain annular seals 214. The piston 200 functions similarly to the previously described first embodiment piston 134.

An annular groove 218 in the interior chamber 206 at its open end 210 retains a slightly convex spring metal diaphragm 220, having a central aperture 222. A stanchion 224 extends coaxially in the interior chamber 206 from the end wall 208 towards the metal diaphragm 220. A bore 226 extending coaxially into the free end of the stanchion 224 forms an annular, axially extending lip 228.

Referring to FIG. 1, and to each of FIGS. 7 to 9, operation of the control valve 200 in the three operating conditions of the brake actuator 10 will now be described. When the brake actuator is in the first condition (normal operation, second spring chamber portion 63 pressurized), as shown in FIG. 8, the valve pin 74a of the caging tool 70a forces the piston 202 into the valve body 122a so that the radial passageways 216 and seal 214 are inward of the annular groove 140a. In this position, the piston 202 closes the control valve 200.

When the brake actuator is in the second condition (second spring chamber portion 63, and first service chamber portion 26 both depressurized) as illustrated in FIG. 7, the piston 202 abuts the inward radial projections 138a, so that the interior chamber 206 communicates with the central bore 68a of the actuator rod 56a. The interior chamber 206 is open to the first service chamber portion 26 through the central aperture 222 of the metal diaphragm 220. The metal diaphragm 220 and stanchion 224 perform essentially the same function as the previously described float piston 152. When the brake actuator 10 is in the third condition (second spring chamber portion 63 depressurized and first service chamber portion 26 pressurized), as illustrated in FIG. 9, the pressure differential across the metal diaphragm 220 causes it to deform towards the stanchion 224, engaging the lip 228 thereon. The central aperture 222 of the metal diaphragm 220 aligns with the stanchion bore 226 so that in this position flow through the aperture 222 is greatly reduced. The spring constant of the metal diaphragm 220 is large, so that pressure differentials above approximately 35 psig in the first service chamber portion 26 will cause the metal diaphragm 220 to deform into contact with the stanchion 224.

Figure 10:
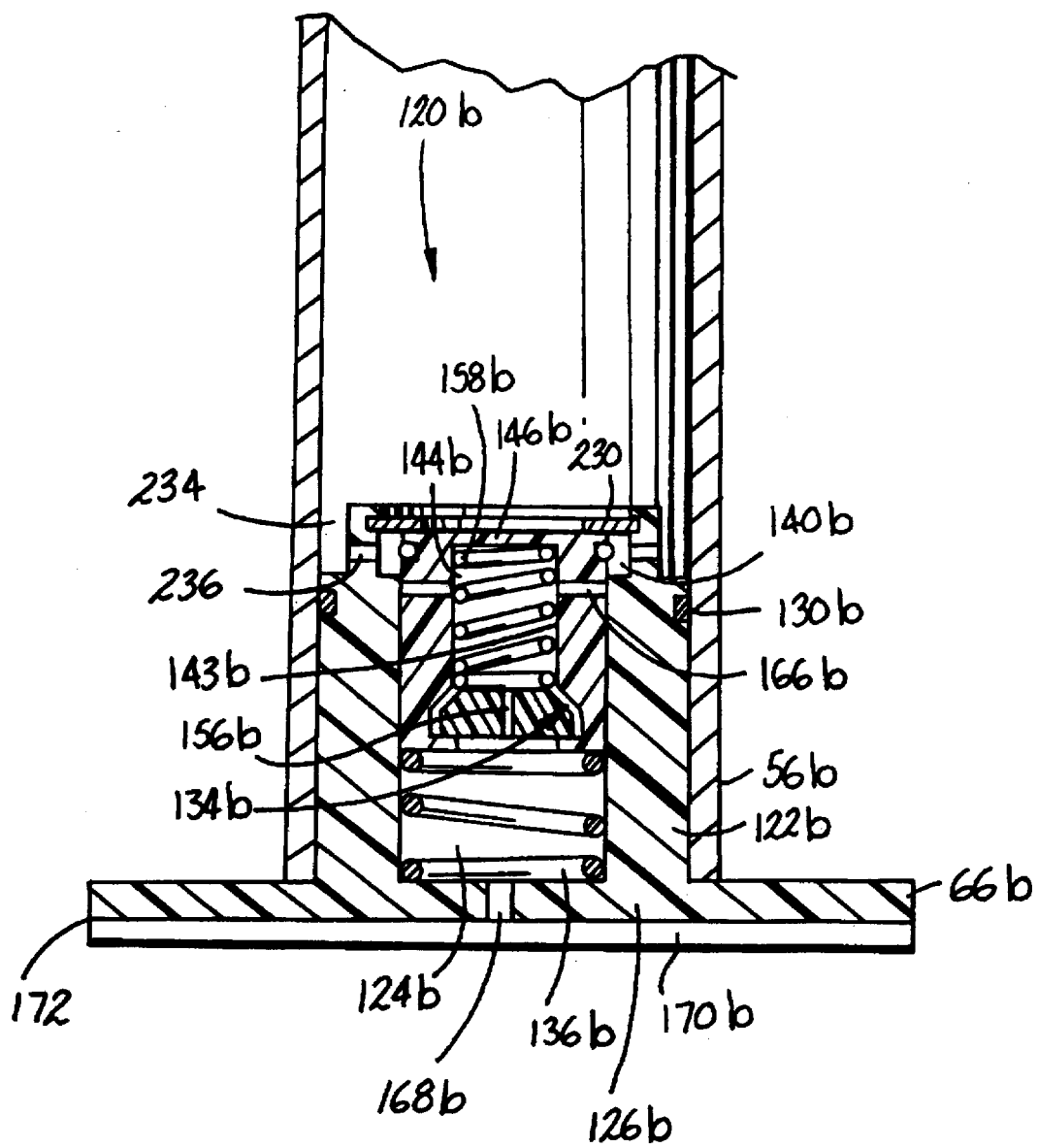
FIG. 10 is an enlarged fragmentary cross sectional view of a third embodiment of a control valve according to the invention.

An alternative means for restraining movement of the main piston 134 or 134a is illustrated in FIG. 10, where like parts are numbered with like numerals. The inwardly directed radial projections 138 or 138a of the first and second embodiments are replaced by a snap ring 230. The snap ring 230 is received within an annular snap ring groove 232 in the annular groove 140b, and projects inwardly radially from the snap ring groove 232 a sufficient distance to abut the end wall 146b of the main piston 134b. When the main piston 134b abuts the snap ring 230, the interior chamber 144b communicates with the annular groove 140b through the radial passageways 166b. An annular groove 234 encircles the exterior of the control valve body 122b, at its uppermost edge. The annular groove 140b remains in constant fluid communication with the central bore 68b of the actuator rod 56b through a plurality of axial passageways 236 leading from the annular groove 140b to the annular groove 234.

Preferably, the valve body 122, reaction plate 66, the main pistons 134, 202, and the float piston 152 are formed of plastic.

The invention has been described with reference to a particular check valve 100 in the spring brake housing. However, other check valves, such as a flap valve, can be used in lieu of the plug 100 to pass air from the first spring chamber 62 to atmosphere and block air flow from the operating environment into the first spring chamber.

Also, alternate valves can be provided in place of the control valves 120 and 200 disclosed herein for preventing flow through the actuator rod 56 when it is in its retracted position. For instance, the actuator rod 56 can be made to seal against the end of the head 48 when the actuator rod 56 is retracted, or the distal end 55 of the actuator rod 56 can be formed with a narrower diameter receiver which receives the head portion 72 of the caging tool 70, so that the head portion 72 effectively seals the actuator rod 56. The invention has been described with reference to a diaphragm style spring brake actuator for illustration purposes only, and it would applicable to piston style brake actuators as well.

Figure 11:
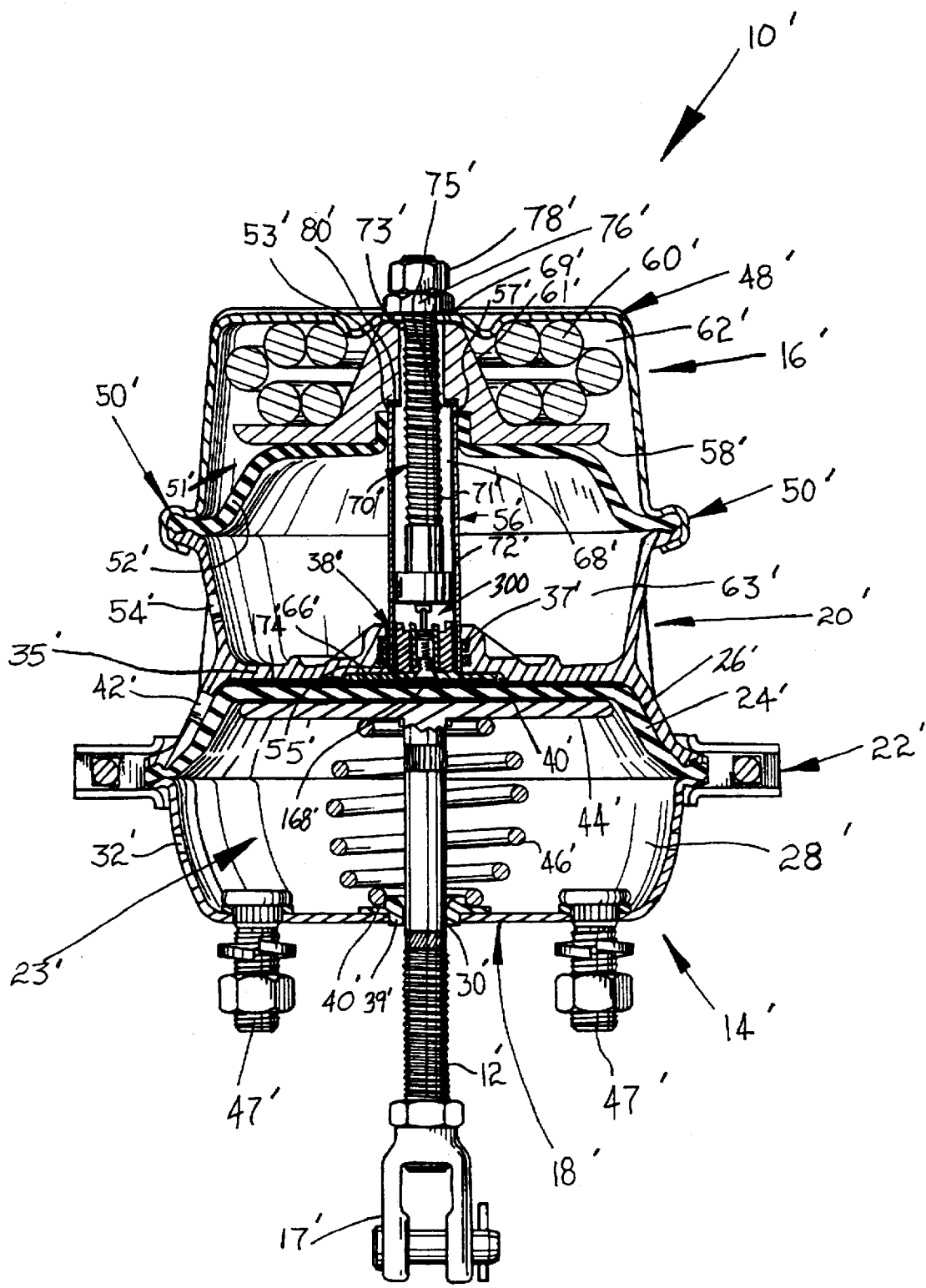
FIG. 11 is a cross sectional view of an operated brake actuator incorporating a fourth embodiment of a control valve according to the invention.

Turning to FIG. 11, a fourth embodiment of a control valve 300 according to the invention is illustrated. The valve 300 is shown incorporated into a spring brake actuator 10'. The spring brake actuator 10' is essentially identical to the spring brake actuator 10 of the previous embodiments except for particulars with regard to the control valve 300 and the fact that the head 48' contains no ports such as the port 65 in the spring brake actuator 10 (see FIG. 1). Accordingly, like parts will be given like primed reference numerals.

The control valve 300 in the spring brake actuator 10' seals the first spring brake chamber portion 62' from the environment without the need for vents 100 in ports as in the first three embodiments. The control valve 300 accomplishes this function by selectively opening a fluid communication through the actuator rod 56' in both directions to both fill the first spring chamber portion 62' as the spring 60 extends and to exhaust air from the first spring chamber portion 62' as the spring 60' is retracted.

Figure 12:
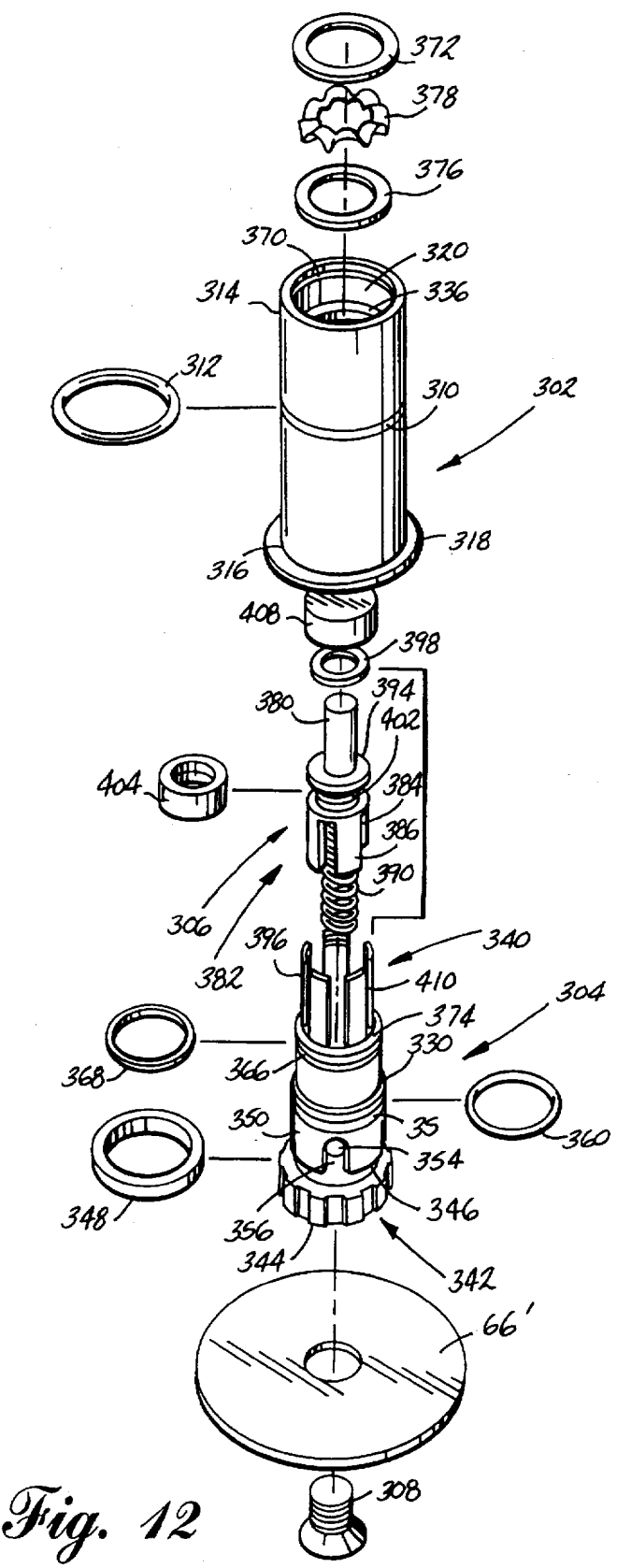
FIG. 12 is an exploded perspective view of the control valve of FIG. 11, shown in an open position.

Turning to FIG. 12, the valve 300 comprises generally a cylindrical valve body 302 coaxially receivable within the actuator rod bore 68' (not shown in FIG. 12), a poppet 304 coaxially received within the valve body 302, and a spool 306 coaxially received within the poppet 304. The reaction plate 66' bolts to the poppet 304 by means of a screw 308 coaxially received through the reaction plate 66' and into the poppet 304.

Figure 13:
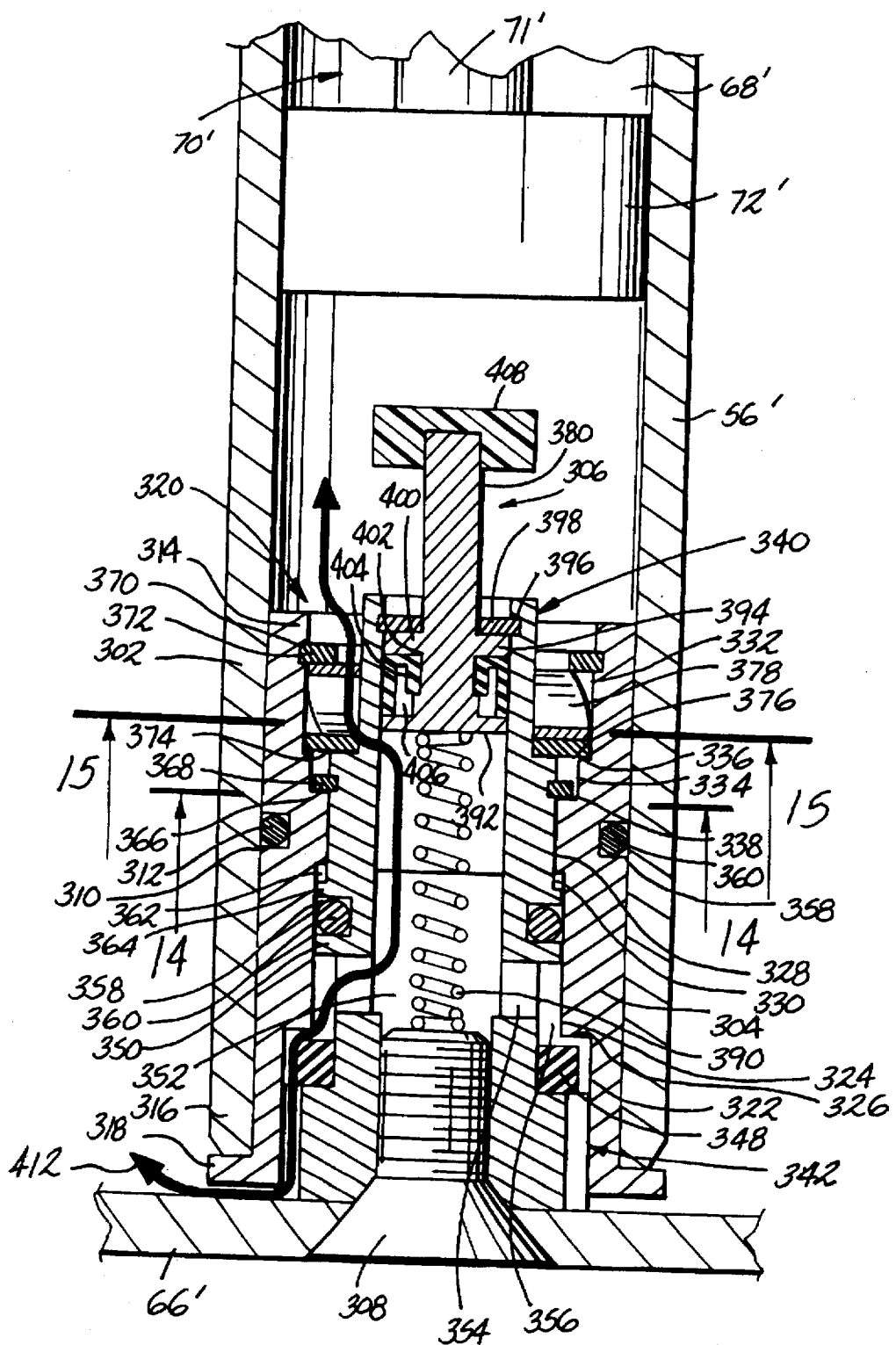
FIG. 13 is a sectional view of the control valve of FIG. 12.

Turning also to FIG. 13, receipt of the valve body 302 within the central bore 68' of the actuator rod 56' is illustrated. An annular groove 310 about the outer circumference of the valve body 302 receives an O-ring 312 to seal the valve body 302 to the actuator rod 56'. The valve body 302 has an inward end 314 and an outward end 316. An annular flange 318 at the body outward end 316 projects outwardly radially to engage the end of the actuator rod 56' and limit movement of the valve body 302 inwardly of the actuator rod bore 68'. Preferably, the body 302 is formed of a corrosion resistant steel.

The poppet 304 is coaxially received within a central coaxial bore 320 through the body 302, the bore 320 being of varying internal diameters. An outermost portion 322 of the bore 320 has a larger diameter than an adjacent mid-outer portion 324 of the bore 320 to produce a first outwardly facing annular shoulder 326. A central portion 328 of the bore 320 is of smaller diameter than the mid-outer portion 324 creating a second outwardly facing annular shoulder 330. On the body inward end 314, an innermost portion 332 of the bore 320 is of larger diameter than an adjacent mid-inner portion 334 creating a first inwardly facing annular shoulder 336. The mid-inner portion 334 is of larger diameter than the central portion 328 to create a second inwardly facing annular shoulder 338.

The poppet 304 is preferably formed of a plastic, such as Delrin™, and comprises an inner end 340 and outer end 342. The outer end 342 is sized to fit closely within the bore outermost portion 322 and a plurality of longitudinal grooves 344 about the outer surface of the poppet outer end 342 provide passage for fluid between the poppet 304 and the body 302 at the bore outermost portion 322. An annular groove 346 about the exterior of the poppet 304 adjacent to the outermost end 342 receives an annular seal 348 which is positioned within the body 302 at the bore outermost portion 322 and adjacent the first outwardly facing annular shoulder 326. The diameter of the seal 348 is less than the bore outermost portion 322 diameter providing passage for fluid between the seal 348 and body 302 at the bore outermost portion 322. However, the diameter of the seal 348 is greater than the bore mid-outer portion 324 so that when the seal 348 abuts the first outwardly facing annual shoulder 326, the bore outermost portion 322 is sealed from the bore mid-outer portion 324 by the seal 348.

A center portion 350 of the poppet 304, inwardly adjacent the groove 346 has a diameter sized to closely fit within the bore mid-outer portion 324. The poppet 304 also has a central coaxial bore 352. A plurality of radial apertures 354 extend through the poppet central portion 350 and into the central bore 352. Also, longitudinal channels 356 on the outer surface of the poppet central portion 350 extend from the radial apertures 354 outwardly to the annular groove 346. The longitudinal grooves 356 and radial apertures 354 provide passage for fluid between the body 302 and poppet 304 at the body bore mid-outer portion 324 and the passage of fluid into the poppet central aperture 352. An annular groove 358 about the poppet central portion 350 is located inwardly adjacent the radial apertures 354 and receives an O-ring 360 to seal the poppet central portion 350 to the body 302. Inwardly adjacent the poppet central portion 350, the poppet 304 narrows to a mid-inner portion 362 sized to fit closely within the body bore central portion 328 and thus forms an inwardly facing annular shoulder 364 in confronting relationship with the outwardly facing annular shoulder 330 on the body 302. An annular groove 366 about the poppet mid-inner portion 362 receives an annular snap ring 368 which abuts the second inwardly facing annular shoulder 338 on the body 302 to limit outward movement of the poppet 304 with respect to the body 302.

An annular groove 370 in the body 302 at the bore innermost portion 332 receives a snap ring 372. The poppet inner end 340 is of a reduced diameter with respect to the poppet mid-inner portion 362 to form an inwardly facing annular shoulder 374. A rigid annular washer 376 encircles the poppet inner end 340 and abuts the inwardly facing annular shoulder 374. An annular wave washer 378 is compressed between the snap ring 372 and the rigid washer 376 to bias the poppet 304 outwardly of the valve body 302. As the poppet 304 moves outwardly of the body 302, the rigid washer 376 abuts the first inwardly facing annular shoulder 336 on the body 302 to limit the distance through which the wave washer 378 biases the poppet 304.

Figure 14:
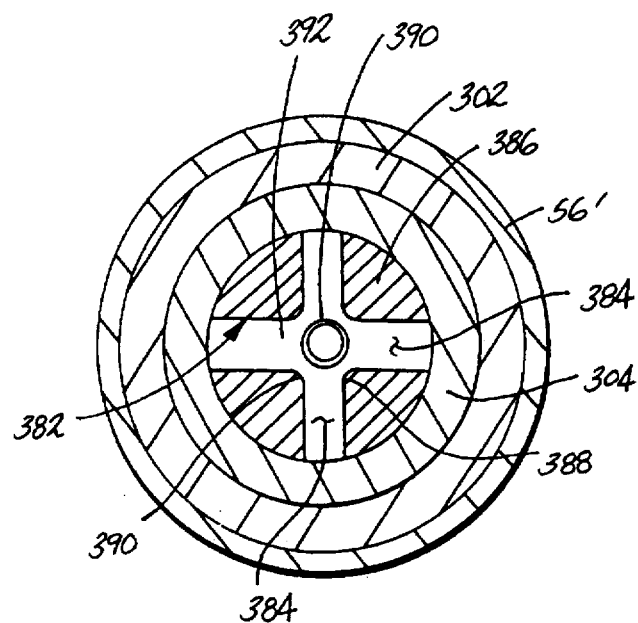
FIG. 14 is a cross sectional view of the control valve taken along line 14—14 of FIG. 13.

The spool 306 is coaxially received within the poppet central bore 352. The spool 306 is preferably formed of a plastic such as Delrin™ and comprises a solid cylindrical inner end 380 of a first diameter and an opposite outer end 382 of a second, larger diameter. A discoidal cap 408 fits over the spool inner end 380. Two longitudinally elongated diametrical slots 384 pass entirely through the spool outer end 382, normal to each other, to form four longitudinal fingers 386 of generally triangular cross-section. Innermost corners 388 of each of the fingers 386 are provided with a slight radius bend (see FIG. 14). A series of elongated longitudinal slots 410 through the poppet inner end 340 along with the slots 384 through the spool outer end 382 provide fluid passage from the popper central bore 352 to the body bore innermost portion 332 when the spool 306 is in the position illustrated in FIG. 13.

A central portion 394 of the spool 306 and the spool inner portion 382 are of a diameter to fit closely within the poppet central bore 352. To bias the spool 306 inwardly of the actuator rod 56', a coil compression spring 390 extends from the screw 308 coaxially within the poppet central bore 352, between the fingers 386 to abut the spool 306 at a outwardly facing wall 392. An annular groove 396 in the poppet at the central bore 352 innermost end receives an annular snap ring 398 which abuts an inwardly facing shoulder 400 formed at the transition between the spool central section 394 and inner end 380. The snap ring 398 thus limits inward movement of the spool 306.

When moved outwardly toward the reaction plate 66' past the slots 410, the spool 306 seals against poppet 304 to block fluid flow through the poppet central bore 352. To enhance the seal between the spool 306 and poppet 304, a U-shaped Parker™ seal 404 having an open end 406 facing outwardly is received within an annular groove 402 about the spool central section 394 and is adapted to seal against the poppet 304.

Figure 15:
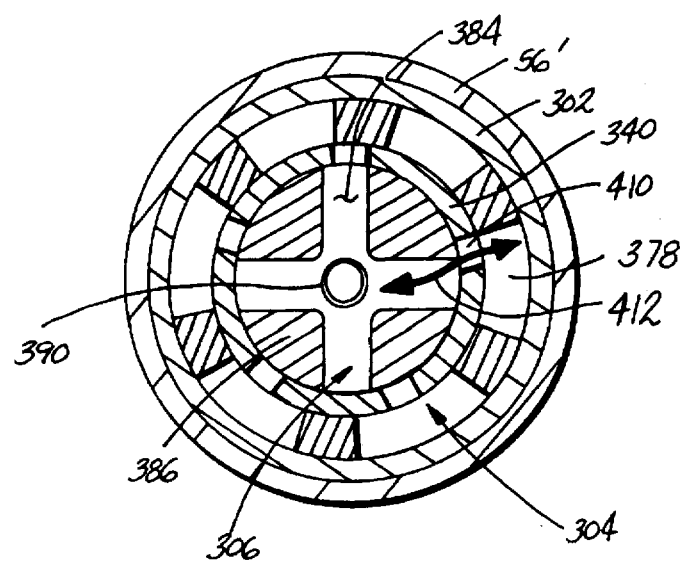
FIG. 15 is a cross sectional view of the control valve taken along line 15—15 of FIG. 13.

The control valve 300 has an open position and two closed positions. The open position is illustrated in FIG. 13 in which a fluid flow path 412 provides fluid communication through the valve 300 to place the first spring chamber portion 62' into fluid communication with the first service chamber portion 26' through the actuator rod central bore 68' and through the control valve 300 (see also, FIG. 11). FIG. 15 best illustrates the portion of the flow path 412 slots through 384 and 410 in the spool 306 and poppet 304, respectively. The remainder of the flow path 412 continues through the apertures 354, grooves 356, between the seal 348 and first outwardly facing annular shoulder 326, between the seal 348 and the bore outermost portion 322, and through the longitudinal grooves 344 in the poppet outer end 342.

Figure 16:
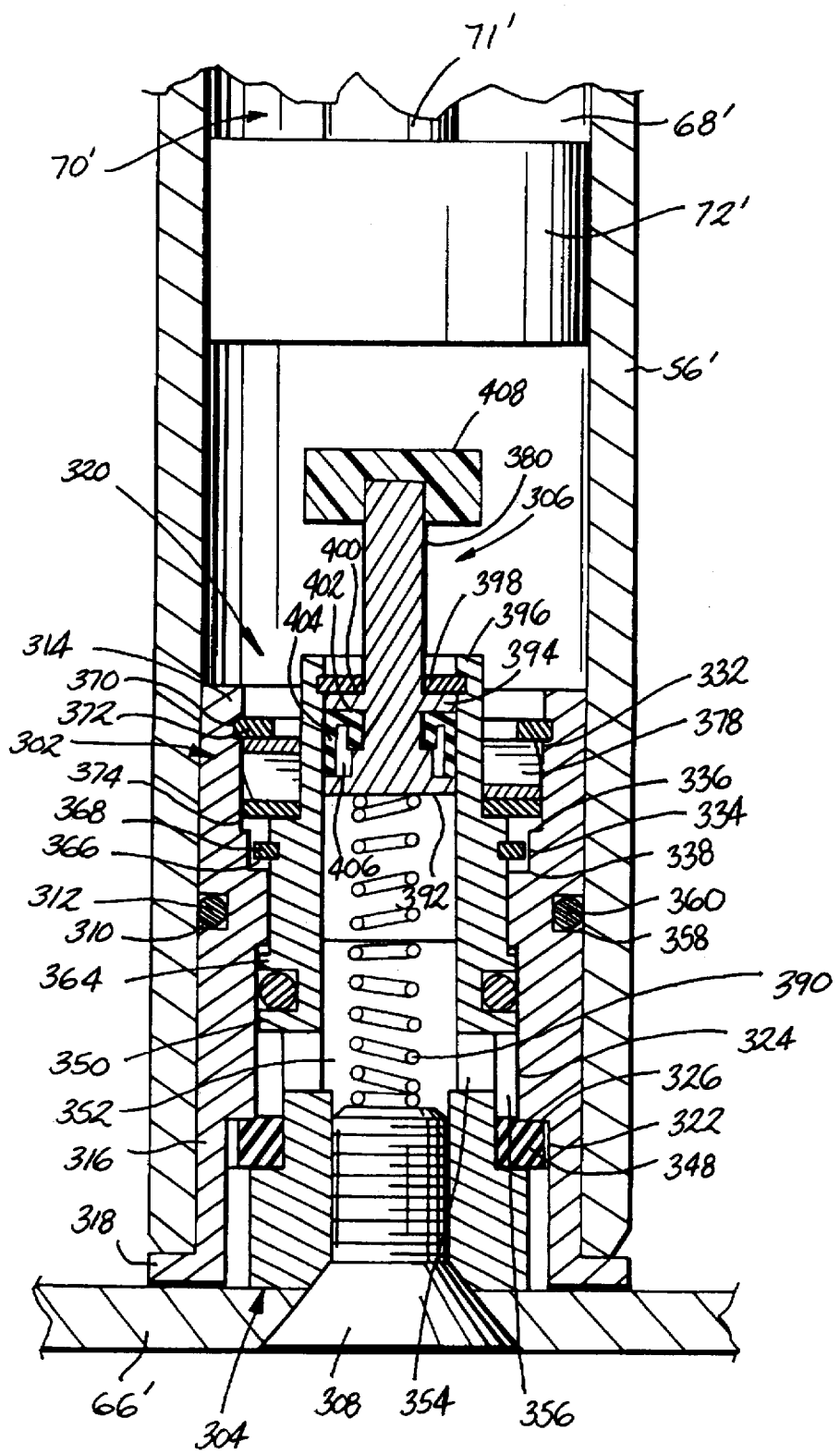
FIG. 16 is a cross sectional view of the control valve of FIG. 12, shown in a first closed position.

FIG. 16 illustrates a first closed mode in which the poppet 304 is driven inwardly of the valve body 302 to compress the seal 348 against the first outwardly facing annular shoulder 326 in the bore 320. This situation arises when the second spring chamber portion 63' is evacuated and the spring 60' has urged the reaction plate 66 into abutment with the diaphragm 24 and pressure plate 44 in the service brake chamber 23 so that the brakes (not shown) are applied, as, for example, when the parking brakes are manually applied. The compression force of the wave washer 378 is greater than the compression force of the return spring 46. Thus, the wave washer 378 normally keeps the poppet 304 biased outwardly with the seal 348 away from the first outwardly facing annular shoulder 326 even as the spring 60 drives the push rod 12 toward a position to apply the brakes (not shown). However, when movement of the push rod 12 is resisted by the brakes as they are applied to the drums, the compression force of the spring 60 overcomes the compression force of the wave washer 378 to drive the poppet inwardly of the body 302. The seal 348 then seals against the poppet in the annular groove 346 and against the annular shoulder 326 on the valve body 302 and blocks fluid communication therethrough.

Figure 17:
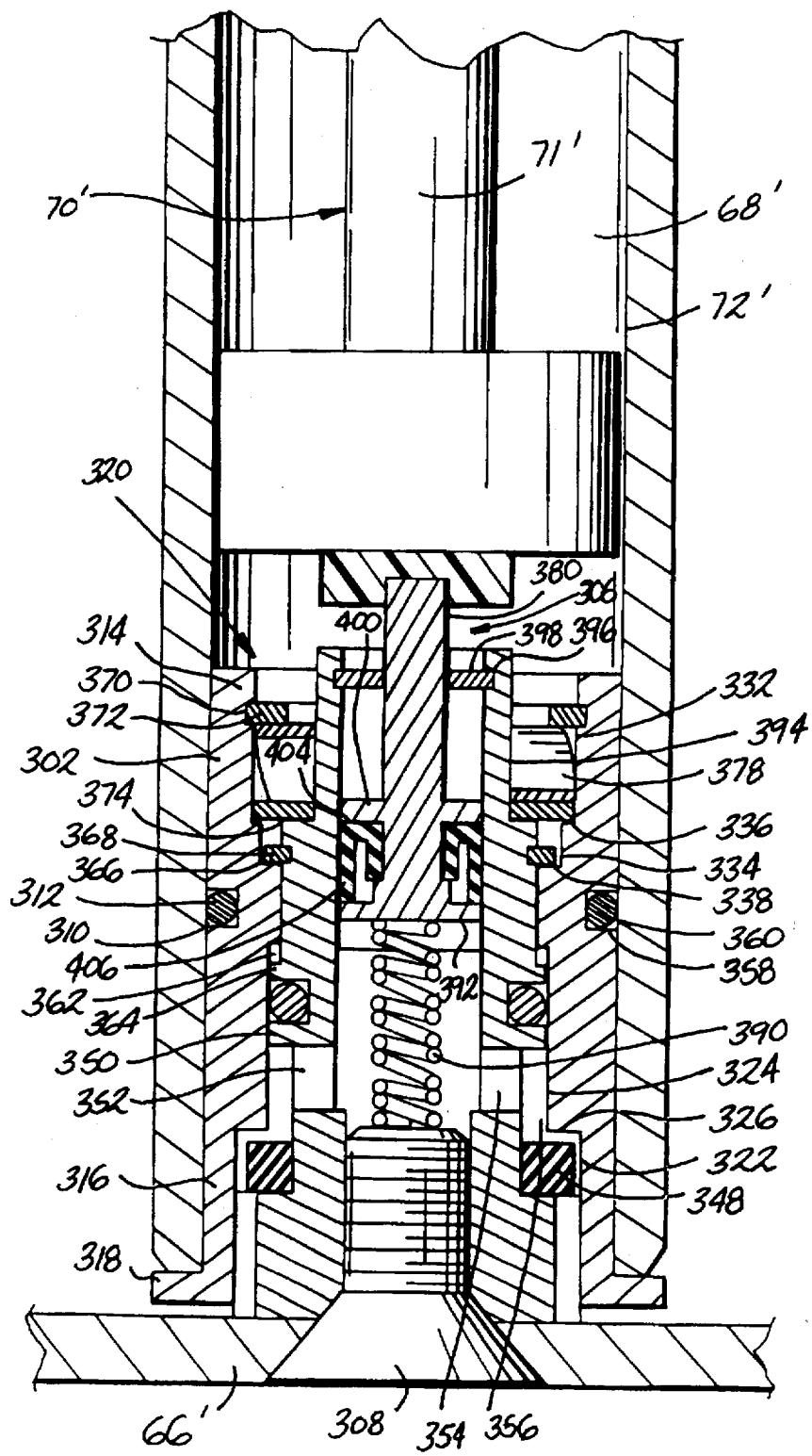
FIG. 17 is a cross sectional view of the control valve of FIG. 12, shown in a second closed position.

A second closed mode of the valve is illustrated in FIG. 17 in which the spool 306 is pressed outwardly by the caging tool 70', thereby moving the Parker™ seal 404 past the slots 410, and blocking flow through them. The U-shaped nature of the seal 404 releases any residual pressure in the actuator rod 56' to burp outwardly past the Parker™ seal 404 even when the control valve 300 is in the second closed position as shown in FIG. 17.

The position of the control valve 300 represented by FIG. 17 corresponds to the normal operating condition of the spring brake actuator 10' as illustrated in FIG. 11. When the second spring brake chamber 63' is pressurized, the actuator rod 56' retracts and brings the spool 306 into abutment with the head 72' of the caging tool 70'. In this orientation of the spring brake actuator 10, it is undesirable to have fluid communication between the first service chamber portion 26 and first spring chamber portion 62. If there were communication in this normal operating condition, every time pressure is applied to the first service brake chamber portion 26, pressure would also thus be applied to the first spring chamber portion 62, thereby equalizing pressure on both sides of the diaphragm 52. Spring 60 would then move the actuator rod 56 outwardly. Thus, it is necessary to place the control valve 300 into a closed position when the actuator rod 56 is retracted.

Hence, most of the time the control valve 300 will be in either one of its closed positions as illustrated in FIGS. 16 and 17. Only during the brief moments when the actuator rod 56' is neither extended nor retracted will the valve 300 be placed into the open position as illustrated in FIG. 13. Accordingly, the first spring chamber portion 62' will remain essentially sealed from the harmful influences of the environment.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. In a brake actuator for a vehicle, comprising:
   a service brake housing;

a tandem spring brake housing;

a first movable member, disposed within the service brake housing, dividing the interior thereof into a first service brake chamber and a second service brake chamber, and reciprocally movable therein in response to the delivery and exhaust of pressurized fluid to the first service brake chamber;

a second movable member, disposed within the spring brake housing, dividing the interior thereof into a first spring brake chamber and a second spring brake chamber, and reciprocally movable therein in response to the delivery and exhaust of pressurized fluid to the second spring brake chamber;

a power spring disposed in the first spring brake chamber in a position to move the second movable member upon exhaust of fluid from the second spring brake chamber; and a hollow actuator rod having an open proximal end mounted to and extending through the second movable member for reciprocal movement therewith between an extended position and a retracted position, and an open distal end disposed within the first service brake chamber in a position to move the first movable member with the movement of the second movable member;

a control valve at the distal end of the actuator rod to control the flow of fluid pressure through the actuator rod between the first service brake chamber and the first spring brake chamber;

characterized in that:

the control valve is mounted in the distal end of the actuator rod; the control valve has a valve element movable between an open position to open the control valve and a closed position to close the control valve, and further has a biasing element to bias the valve element to the open position;

a valve actuator including a valve pin positioned in the actuator rod to contact the valve element when the actuator rod is in the retracted position and to move the valve element to the closed position to close the control valve, whereby pressurized fluid is delivered to the first spring brake chamber from the first service brake chamber through the hollow actuator rod as the actuator rod moves from the retracted toward the extended position, pressurized fluid is delivered from the first spring brake chamber to the first service brake chamber through the hollow actuator rod as the actuator rod moves from the extended position toward the retracted position, and pressurized fluid is prevented from moving from the first service brake chamber to the first spring brake chamber through the actuator rod when the actuator rod is in the retracted position.

2. A brake actuator according to claim 1 wherein the first spring chamber is open only through the control valve.

3. A brake actuator according to claim 1 and further comprising a caging bolt extending into the interior of the hollow actuator and an end of said caging bolt forms said valve actuator.

4. A brake actuator according to claim 1 wherein the control valve further comprises a valve body in the actuator rod, a second valve element coaxially received within the valve body for reciprocal axial motion therein between an open position and a closed position;

the valve body having a first abutment surface and the second valve element having a second abutment surface;

the second valve element open position comprising the first and second abutment surfaces spaced from each other whereby a flow path extends between the abutment surfaces; and the second valve element closed position comprising the first and second abutment surfaces in sealing abutment with each other whereby the sealing abutment between the first and second abutment surfaces blocks the flow path through the control valve.

5. A brake actuator according to claim 4 wherein the first abutment surface comprises an annular shoulder within the body and the second abutment surface comprises an annular sealing member on the second valve element.

6. A brake actuator according to claim 5 and further comprising a second biasing element between the valve body and the second valve element to bias the second valve element outwardly of the actuator rod at a predetermined force.

7. A brake actuator according to claim 6 wherein the second valve element extends outwardly of the distal end of the hollow actuator rod and abuts the second movable member when the second valve element is in the open position, whereby the second valve element is moved to the closed position by the force of the second movable member against the bias of the second biasing element.

8. A brake actuator according to claim 4 wherein the control valve further comprises a spool coaxially received within the second valve element for reciprocating axial motion therein between a spool open position and a spool closed position;

the second valve element having a first sealing surface and the spool having a second sealing surface;

the first and second sealing surfaces being spaced from each other when the control valve is open whereby the flow path extends between the spool and the second valve element; and the control valve is closed when the first and second sealing surfaces are in sealing contact with each other.

9. A brake actuator according to claim 8 wherein the second valve element comprises an internal wall defining an axial bore and forming the first sealing surface, and the spool is disposed within the axial bore, with the second sealing surfaces axially aligned with the first sealing surface to close the control valve.

10. A brake actuator according to claim 9 and further comprising a caging tool extending into the actuator rod through the proximal end, and the second biasing element comprises a spring between the second valve element and the spool to bias the second sealing surface away from the first sealing surface and wherein the caging tool forms the valve actuator which abuts the spool and pushes the spool into the second valve element axial bore to place the first and second sealing surfaces into sealing abutment with each other when the hollow actuator rod is in the retracted position.

11. A brake actuator according to claim 1 wherein the control valve has a second valve element movable between an open position for flow through the control valve and a closed position to close the control valve, and further has a second biasing element to bias the second valve element to the open position;

the second valve element being movable to the closed position when an axial force is applied to the distal end opposed to the movement of the actuator rod to the extended position to overcome the force of the second biasing element to bias the second valve element to the open position;

whereby the control valve is closed when the actuator rod is in the extended position and when a brake is applied by the power spring.

12. A brake actuator according to claim 11 wherein the spring brake housing is sealed except for the opening in the hollow actuator rod.

13. In a brake actuator for a vehicle, comprising:

a service brake housing;

a tandem spring brake housing;

a first movable member, disposed within the service brake housing, dividing the interior thereof into a first service brake chamber and a second service brake chamber, and reciprocally movable therein in response to the delivery and exhaust of pressurized fluid to the first service brake chamber;

a second movable member, disposed within the spring brake housing, dividing the interior thereof into a first spring brake chamber and a second spring brake chamber, and reciprocally movable therein in response to the delivery and exhaust of pressurized fluid to the second spring brake chamber;

a power spring disposed in the first spring brake chamber in a position to move the second movable member upon exhaust of fluid from the second spring brake chamber; and a hollow actuator rod having an open proximal end mounted to and extending through the second movable member for reciprocal movement therewith between a retracted position wherein the actuator rod is substantially within the spring brake housing and an extended position wherein the actuator rod extends into the service brake chamber, and an open distal end disposed within the first service brake chamber in a position to move the first movable member with the movement of the second movable member;

a control valve at the actuator rod distal end to control the flow of fluid through the actuator rod;

the improvement wherein:

the control valve has a valve element axially movable between an open position for flow through the control valve and a closed position to close the control valve, and further has a biasing element to bias the valve element to the open position;

the valve element is movable to the closed position when an axial force is applied by the first movable member to the distal end of the actuator rod opposed to the movement of the actuator rod to the extended position to overcome the force of the biasing element to bias the valve element to the open position;

whereby the control valve is closed when the actuator rod is in the extended position and when a brake is applied by the power spring.

14. A brake actuator according to claim 13 wherein the control valve comprises a valve body in the actuator rod and the valve element is coaxially received within the valve body for reciprocating axial motion therein;

the valve body has a first abutment surface and the valve element has a second abutment surface, a flow path through the control valve has a portion thereof passing between the first and second abutment surfaces wherein when the first and second abutment surfaces are in contact, the flow path is blocked, and the biasing element biases the valve element relative to the body wherein the first and second abutment surfaces are biased away from each other.

15. A brake actuator according to claim 14 and further comprising:

a spool coaxially received within the valve element for reciprocating axial motion therein, the valve element having a first sealing surface and the spool having a second sealing surface, an additional portion of the flow path passing between the first and second sealing surfaces wherein when the first and second sealing surfaces are in abutment, the flow path is blocked, a spool biasing element biasing the spool relative to the valve element wherein the first and second sealing surfaces are biased away from each other;

a valve actuator associated with the spring brake housing and positioned to contact the spool when the actuator rod is retracted to move the first and second sealing surfaces into contact with each other when the hollow actuator rod is in the retracted position, whereby the control valve is closed when the hollow actuator rod is in the retracted position.

* * * * *